(12) United States Patent
Kim et al.

(10) Patent No.: US 10,206,215 B2
(45) Date of Patent: Feb. 12, 2019

(54) METHOD FOR ASSIGNING RESOURCES IN WIRELESS COMMUNICATION SYSTEM SUPPORTING DEVICE-TO-DEVICE DIRECT COMMUNICATION, AND APPARATUS THEREFOR

(71) Applicants: LG ELECTRONICS INC., Seoul (KR); INDUSTRY-UNIVERSITY COOPERATION FOUNDATION OF SOONGSIL UNIVERSITY, Seoul (KR)

(72) Inventors: Hakseong Kim, Seoul (KR); Mochan Yang, Seoul (KR); Shanai Wu, Seoul (KR); Yoan Shin, Seoul (KR)

(73) Assignees: LG ELECTRONICS INC., Seoul (KR); INDUSTRY-UNIVERSITY COOPERATION FOUNDATION OF SOONGSIL UNIVERSITY, Seoul (KR)

( * ) Notice: Subject to any disclaimer, the term of this patent is extended or adjusted under 35 U.S.C. 154(b) by 21 days.

(21) Appl. No.: 15/125,115

(22) PCT Filed: Mar. 10, 2015

(86) PCT No.: PCT/KR2015/002276
§ 371 (c)(1),
(2) Date: Sep. 9, 2016

(87) PCT Pub. No.: WO2015/137685
PCT Pub. Date: Sep. 17, 2015

(65) Prior Publication Data
US 2016/0381672 A1  Dec. 29, 2016

Related U.S. Application Data

(60) Provisional application No. 61/951,489, filed on Mar. 11, 2014.

(51) Int. Cl.
*H04W 72/04* (2009.01)
*H04W 72/02* (2009.01)
(Continued)

(52) U.S. Cl.
CPC .......... *H04W 72/048* (2013.01); *H04W 4/70* (2018.02); *H04W 52/242* (2013.01);
(Continued)

(58) Field of Classification Search
CPC ... H04W 72/02; H04W 72/04; H04W 72/048; H04W 4/70; H04W 52/242; H04W 52/283; H04W 58/383; H04W 4/02
See application file for complete search history.

(56) References Cited

U.S. PATENT DOCUMENTS

2008/0089354 A1 *  4/2008  Yoon ................... H04L 27/3488
                                                      370/432
2009/0209207 A1 *  8/2009  Halbauer ............ H04W 52/243
                                                      455/63.1

(Continued)

FOREIGN PATENT DOCUMENTS

KR  1020090043696  5/2009
KR  1020110059618  6/2011
(Continued)

OTHER PUBLICATIONS

PCT International Application No. PCT/KR2015/002276, International Search Report dated Jun. 8, 2015, 2 pages.
(Continued)

*Primary Examiner* — Khaled M Kassim
(74) *Attorney, Agent, or Firm* — Lee Hong Degerman Kang Waimey

(57) ABSTRACT

The present disclosure relates to a method for allocating resource performed by a base station in a wireless communication system that supports a direct communication
(Continued)

between user equipments (UEs) includes acquiring position information and transmission power of a first UE and a second UE; and allocating the resource to the first UE and the second UE based on the acquired position information and transmission power of the first UE and the second UE, wherein allocating the resource preferentially allocates the resource to the first UE.

5 Claims, 22 Drawing Sheets

(51) Int. Cl.
    *H04W 52/24*     (2009.01)
    *H04W 52/28*     (2009.01)
    *H04W 52/38*     (2009.01)
    *H04W 4/70*     (2018.01)
    *H04W 4/02*     (2018.01)

(52) U.S. Cl.
    CPC ....... *H04W 52/283* (2013.01); *H04W 52/383* (2013.01); *H04W 72/02* (2013.01); *H04W 4/02* (2013.01); *H04W 72/04* (2013.01)

(56) References Cited

U.S. PATENT DOCUMENTS

| | | | | |
|---|---|---|---|---|
| 2010/0093364 A1* | 4/2010 | Ribeiro | ............... | H04W 72/082 455/452.2 |
| 2011/0306349 A1* | 12/2011 | Hakola | ................. | H04W 28/04 455/450 |
| 2013/0034136 A1* | 2/2013 | Park | ........................ | H04B 7/026 375/219 |
| 2014/0141789 A1* | 5/2014 | Tarokh | ................. | H04W 72/02 455/450 |
| 2014/0295858 A1* | 10/2014 | Li | ........................ | H04W 74/08 455/450 |
| 2014/0295866 A1* | 10/2014 | Cho | ........................ | H04L 5/003 455/452.1 |
| 2014/0321314 A1* | 10/2014 | Fodor | ................. | H04W 72/085 370/252 |
| 2015/0078279 A1* | 3/2015 | Ko | ........................ | H04W 76/14 370/329 |
| 2015/0078303 A1* | 3/2015 | Jongren | ................. | H04L 1/0026 370/329 |
| 2015/0119056 A1* | 4/2015 | Lee | ..................... | H04W 72/042 455/450 |
| 2015/0223257 A1* | 8/2015 | Wilhelmsson | ...... | H04W 72/082 455/452.1 |
| 2015/0365941 A1* | 12/2015 | Liu | ................... | H04W 72/0446 370/280 |
| 2016/0081073 A1* | 3/2016 | Lindoff | ............. | H04W 72/1257 370/329 |
| 2016/0183219 A1* | 6/2016 | Kim | ................... | H04W 72/0406 370/329 |
| 2016/0227493 A1* | 8/2016 | Kwak | ..................... | H04W 52/50 |
| 2016/0249297 A1* | 8/2016 | Oh | ........................ | H04W 76/14 |
| 2017/0367056 A1* | 12/2017 | Wei | ..................... | H04W 52/383 |

FOREIGN PATENT DOCUMENTS

| | | |
|---|---|---|
| KR | 1020130035964 | 4/2013 |
| KR | 1020130121052 | 11/2013 |
| KR | 1020130126898 | 11/2013 |
| WO | 2013100831 | 7/2013 |

OTHER PUBLICATIONS

Korean Intellectual Property Office Application No. 10-2016-7020872, Office Action dated Jul. 19, 2017, 5 pages.

Kang, Gil-Mo et al., "Cooperative Resource Allocation Scheme for Device-to-Device Communications Underlaying Cellular Networks," Korea Institute of Communication Sciences, Nov. 2013, 3 pages.

* cited by examiner

[FIG. 1]
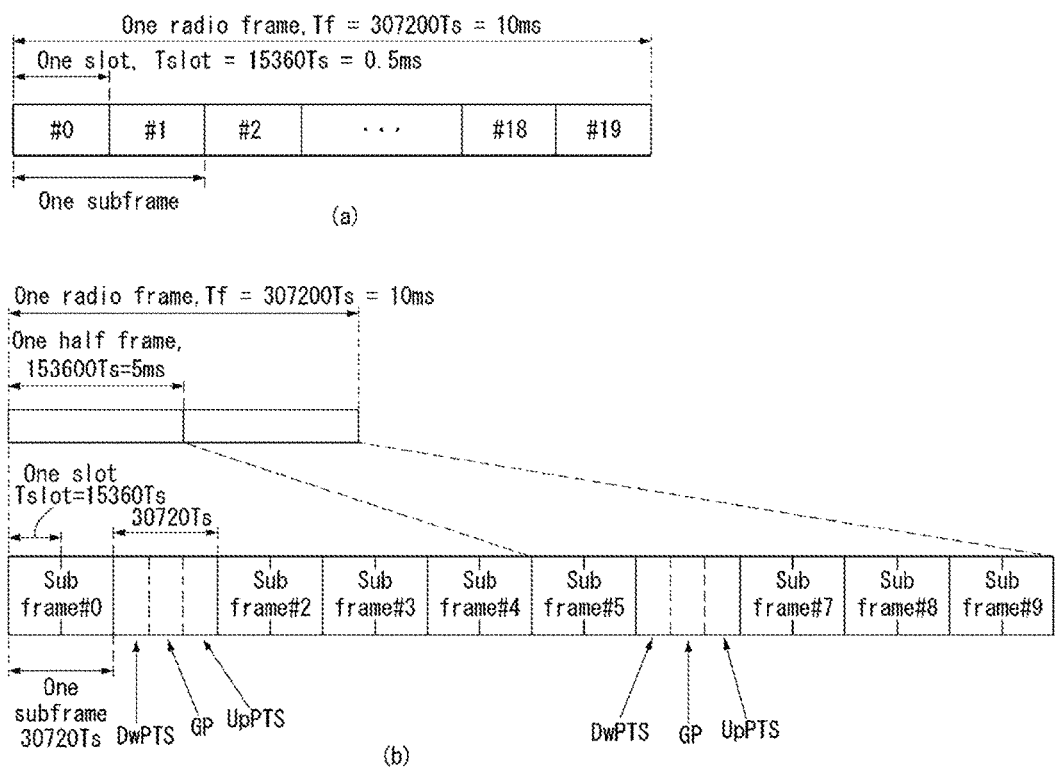

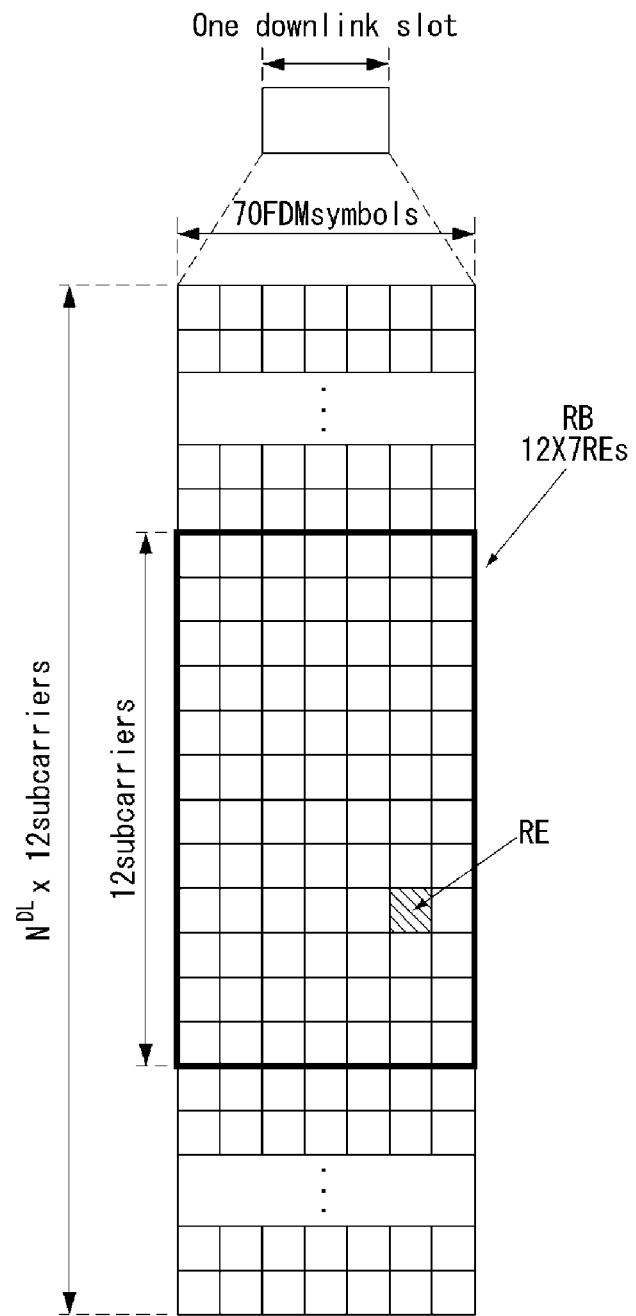
[FIG. 2]

[FIG. 3]
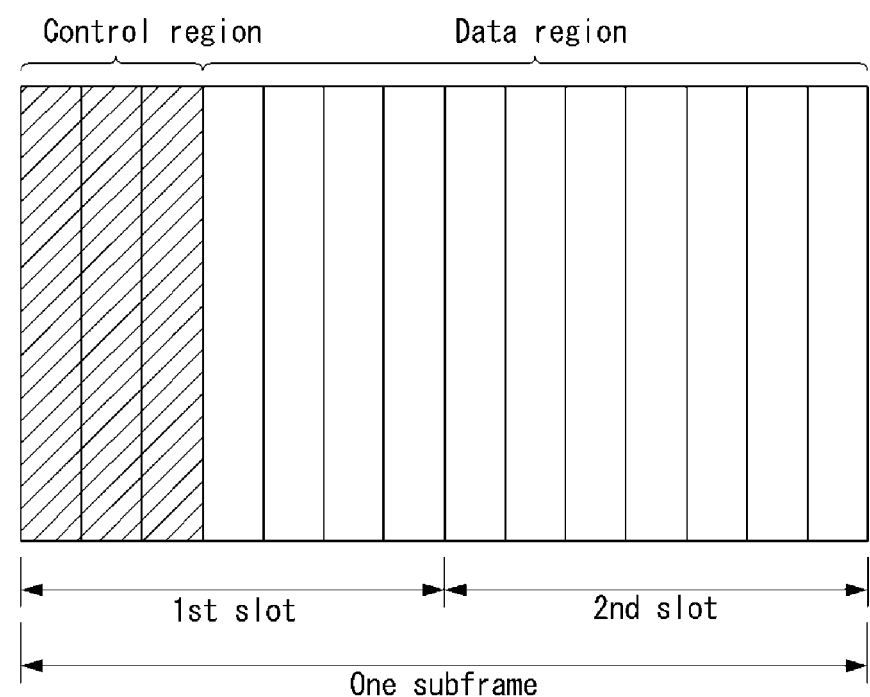
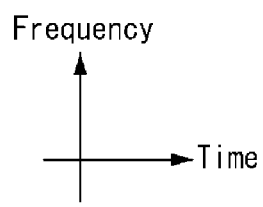

[FIG. 4]
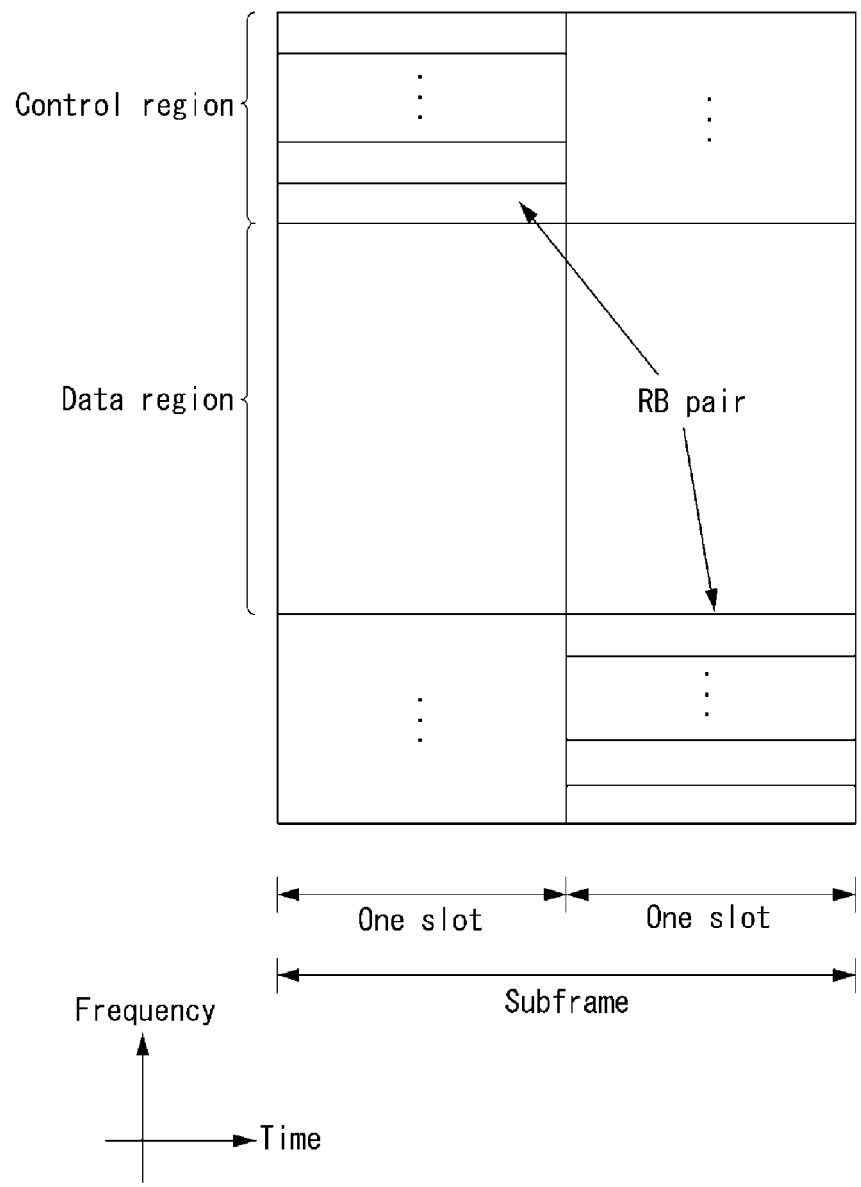

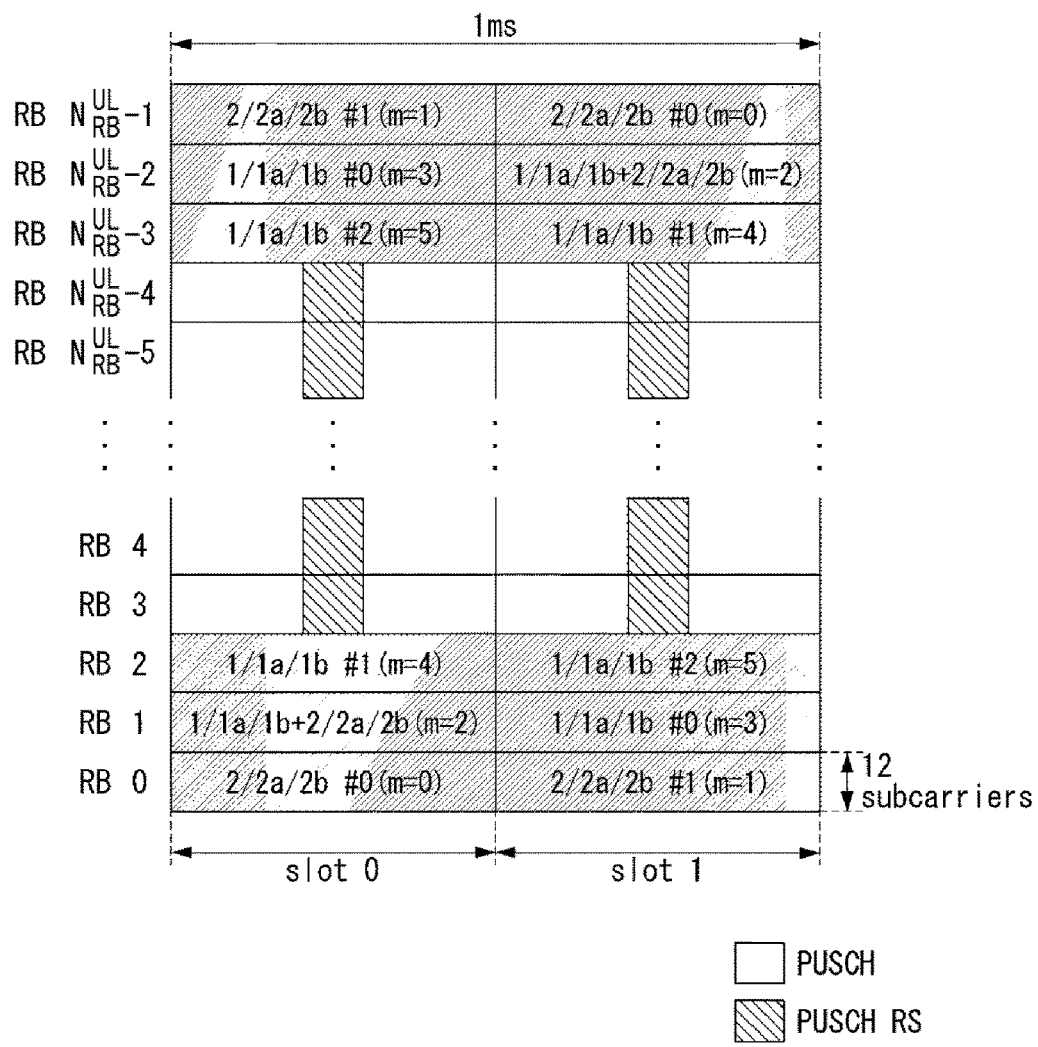
[FIG. 5]

[FIG. 6]
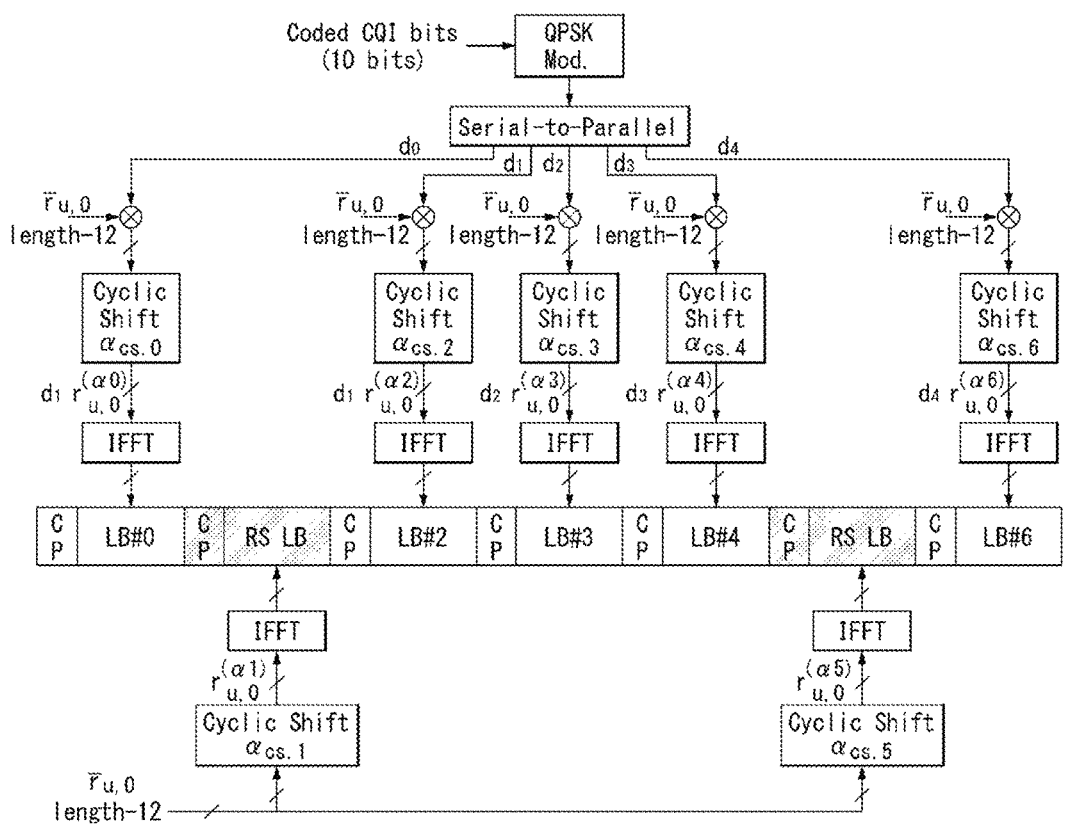

【FIG. 7】
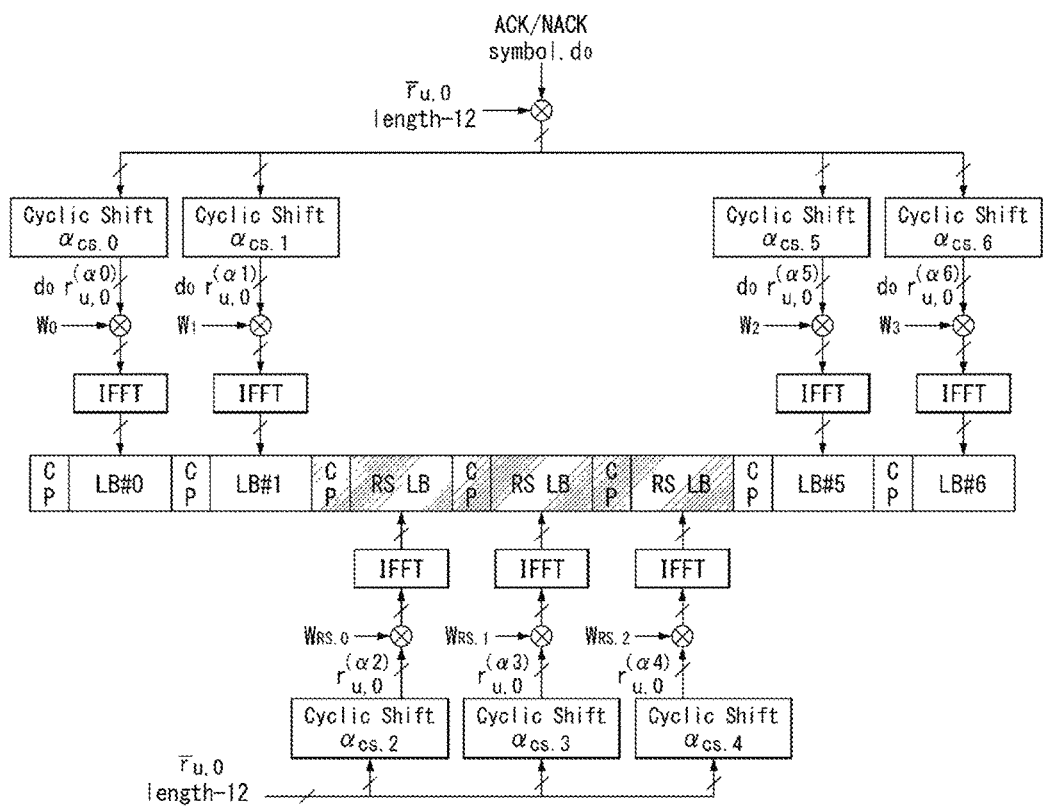

[FIG. 8]
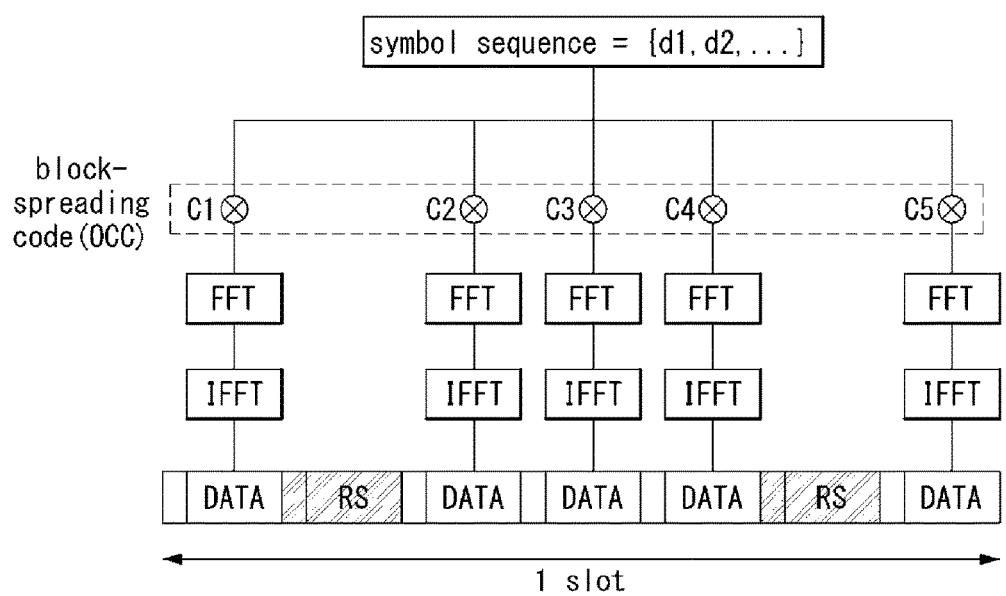

[FIG. 9]
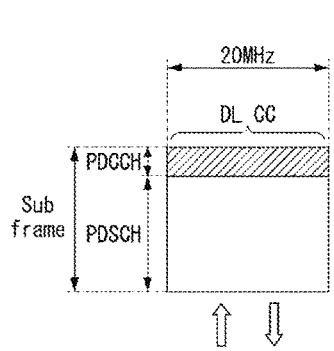
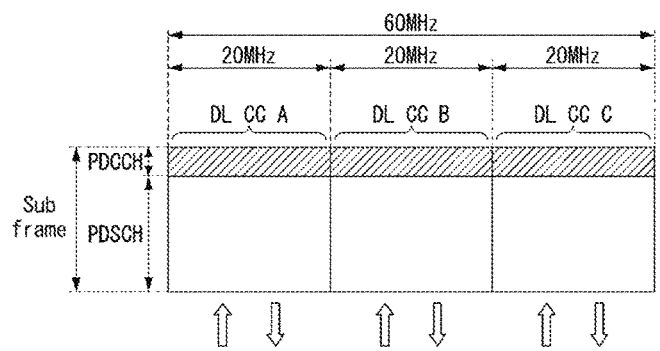
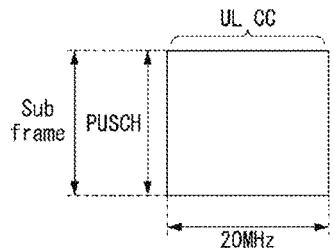
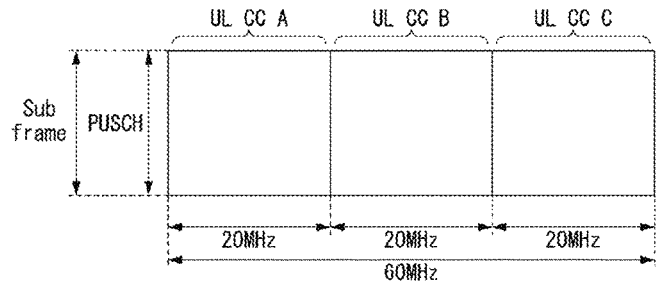
(a) Single CC                    (b) Multiple CC

[FIG. 10]
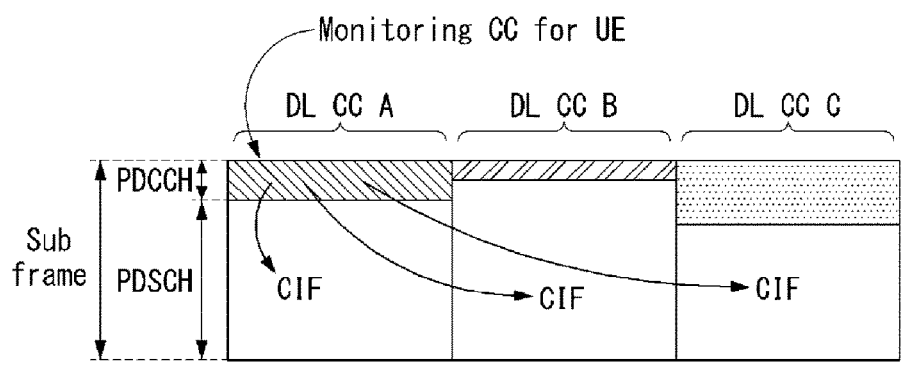
[FIG. 11]
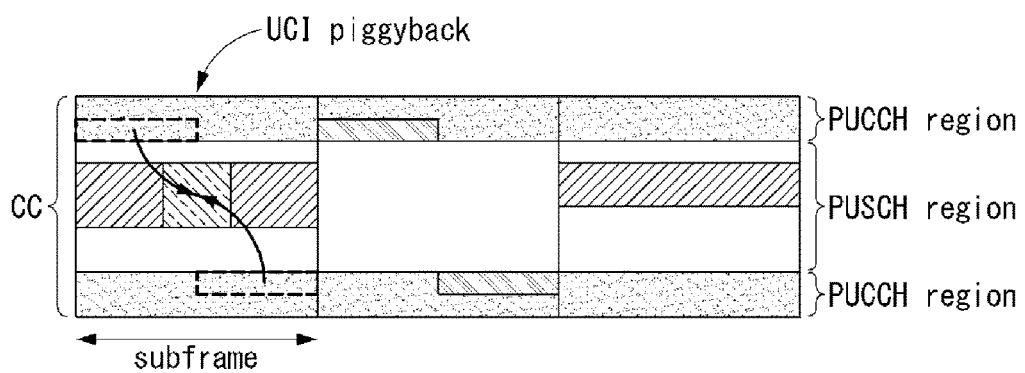

[FIG. 12]
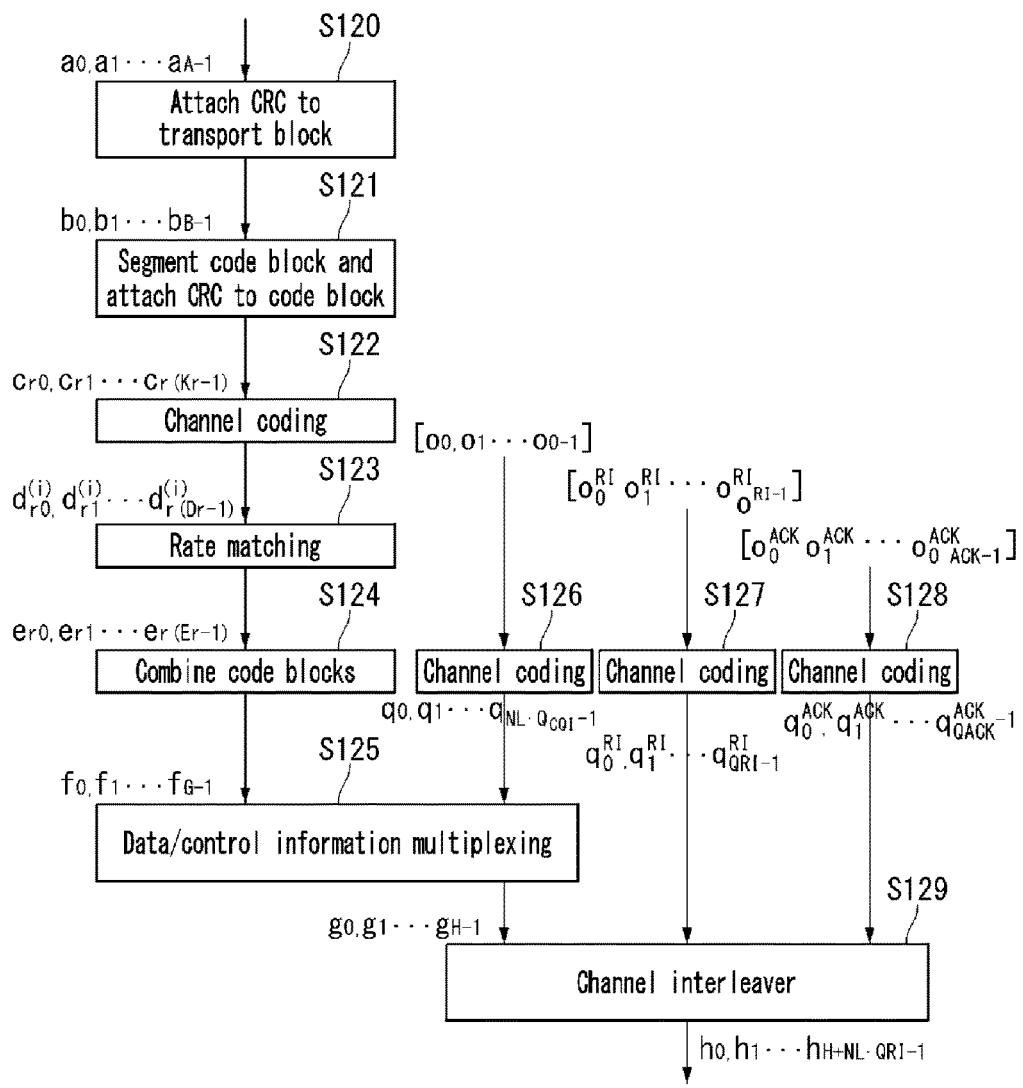

[FIG. 13]
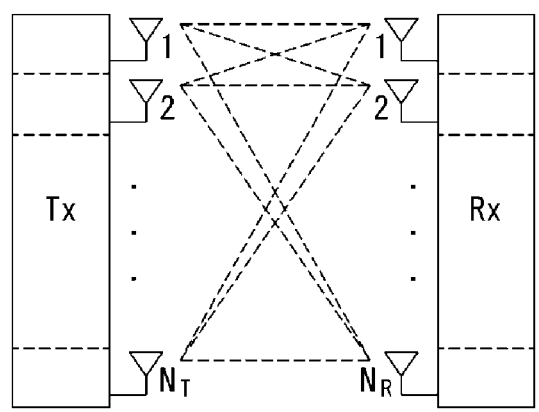
[FIG. 14]
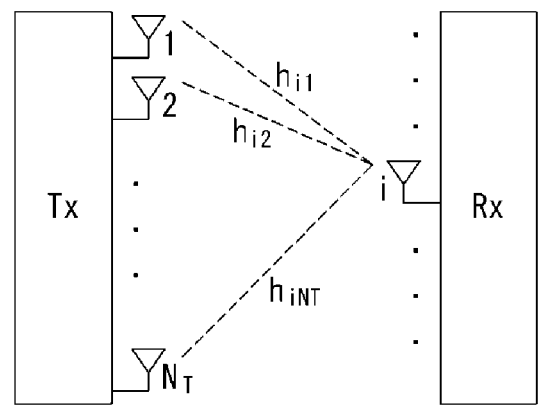

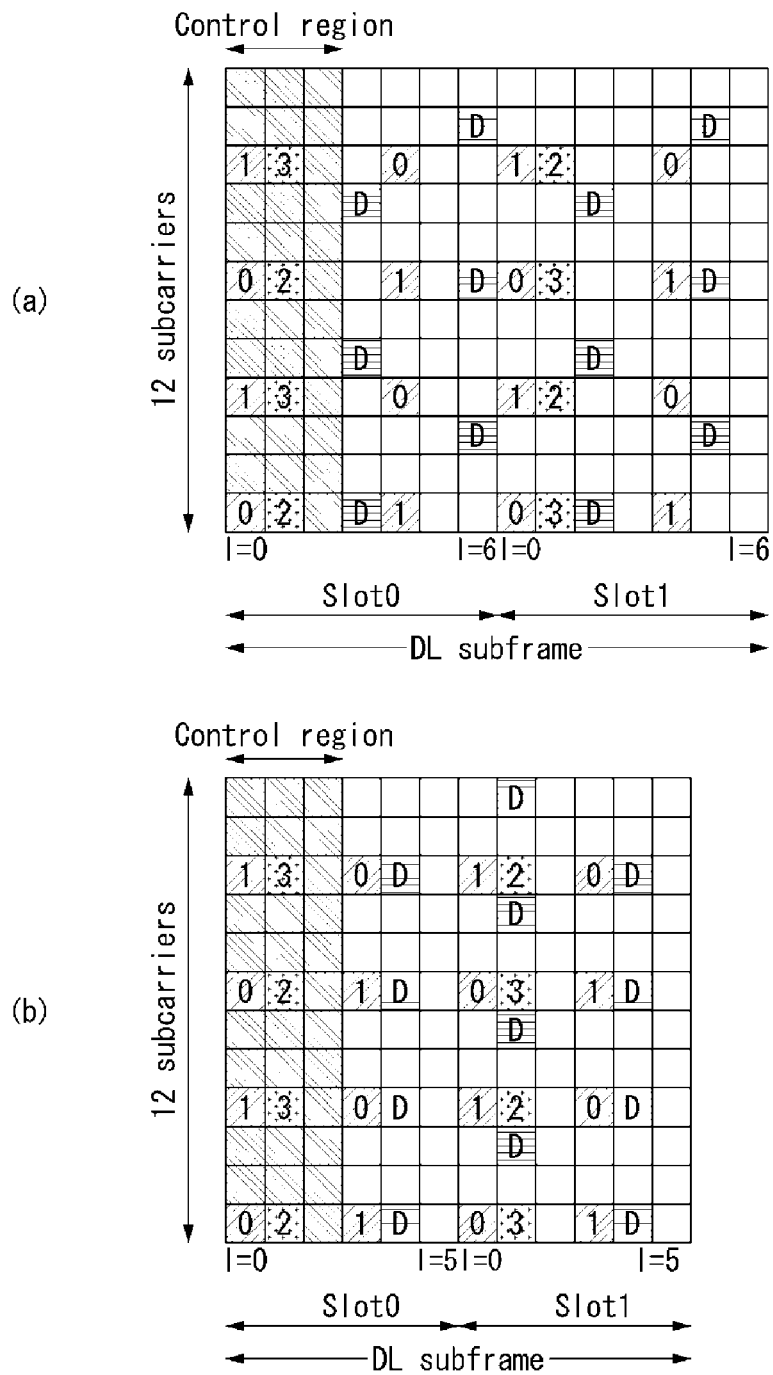
[FIG. 15]

[FIG. 16]
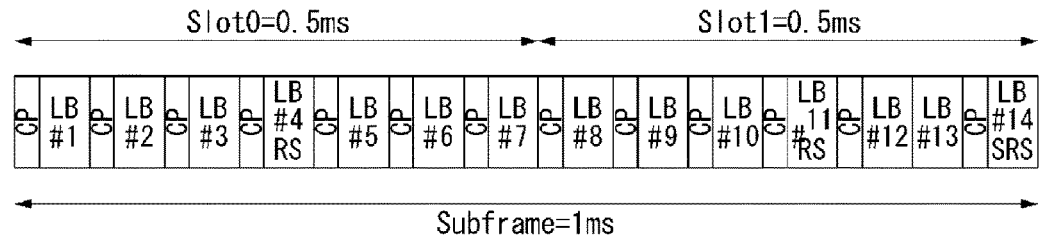
[FIG. 17]
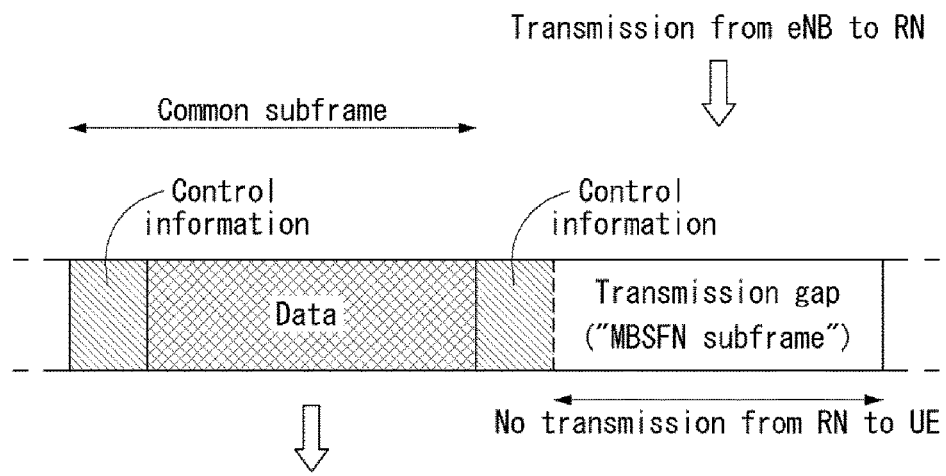
[FIG. 18]
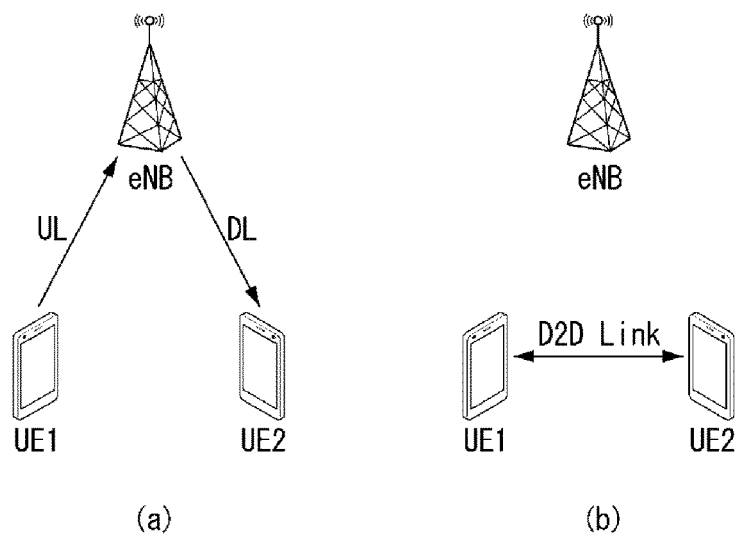
(a)  (b)

[FIG. 19]
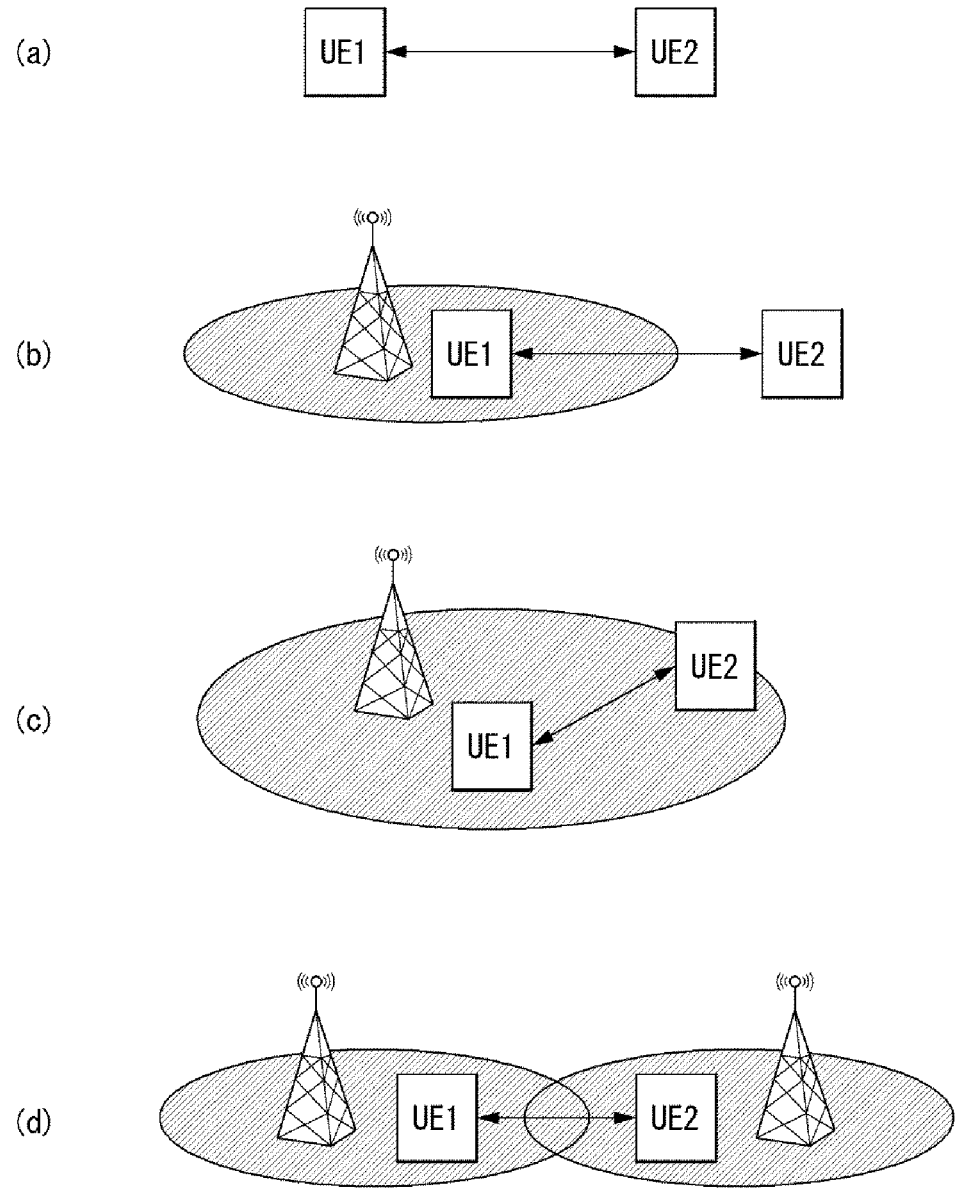

【FIG. 20】
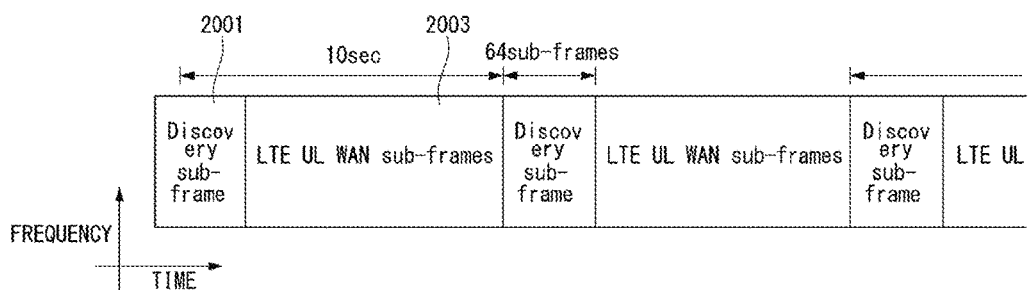

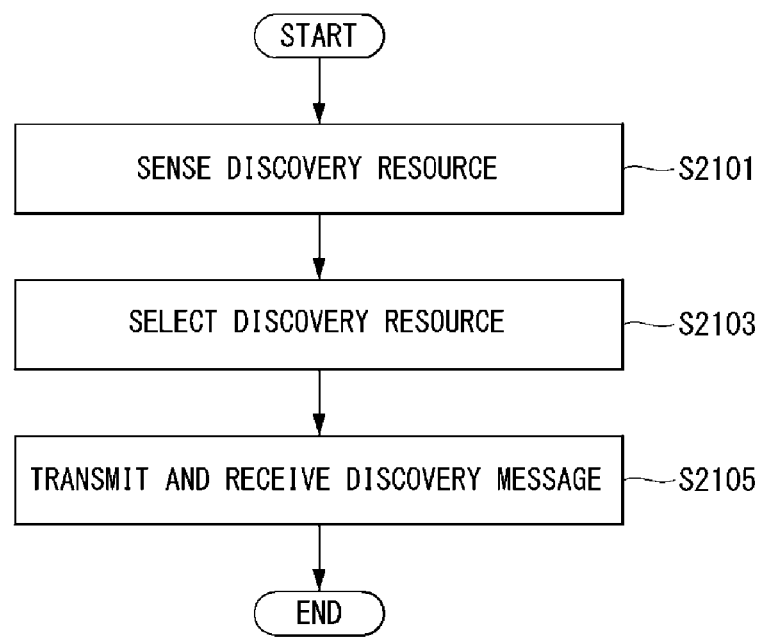
[FIG. 21]

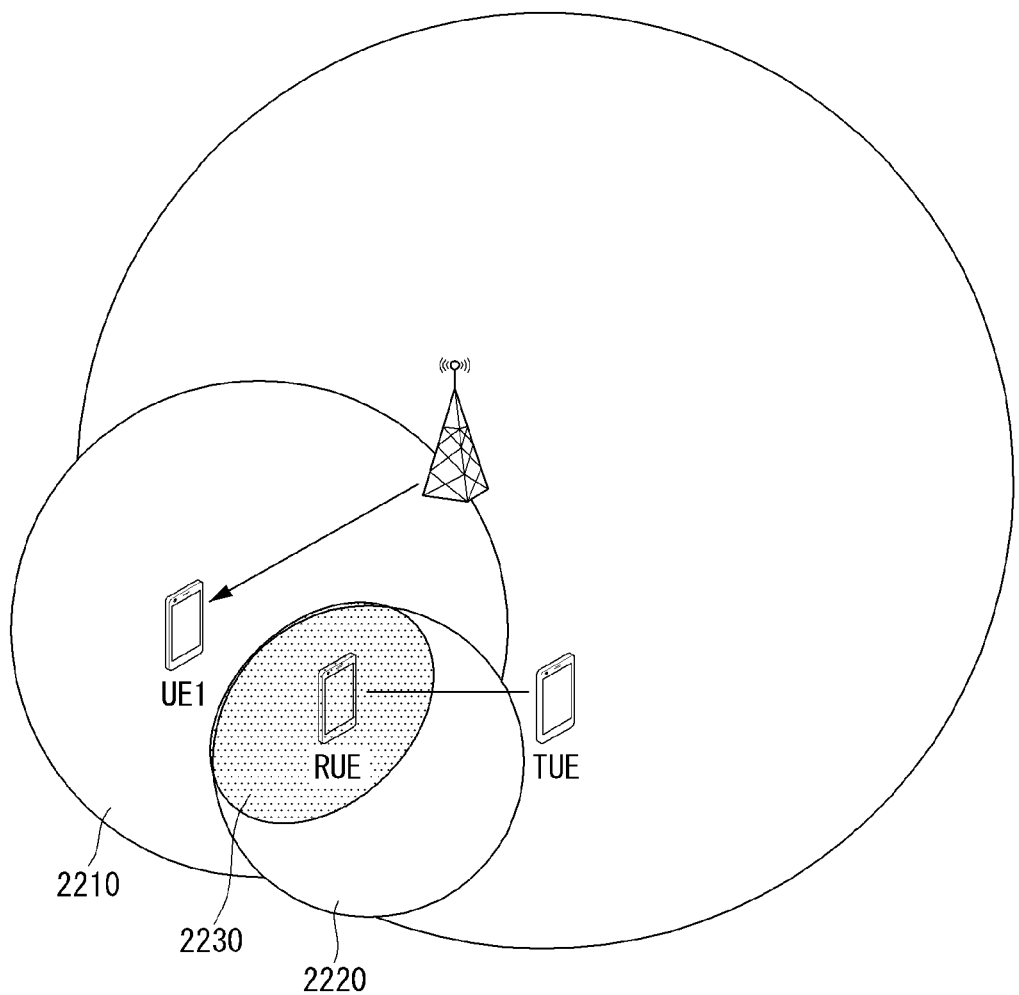
[FIG. 22]

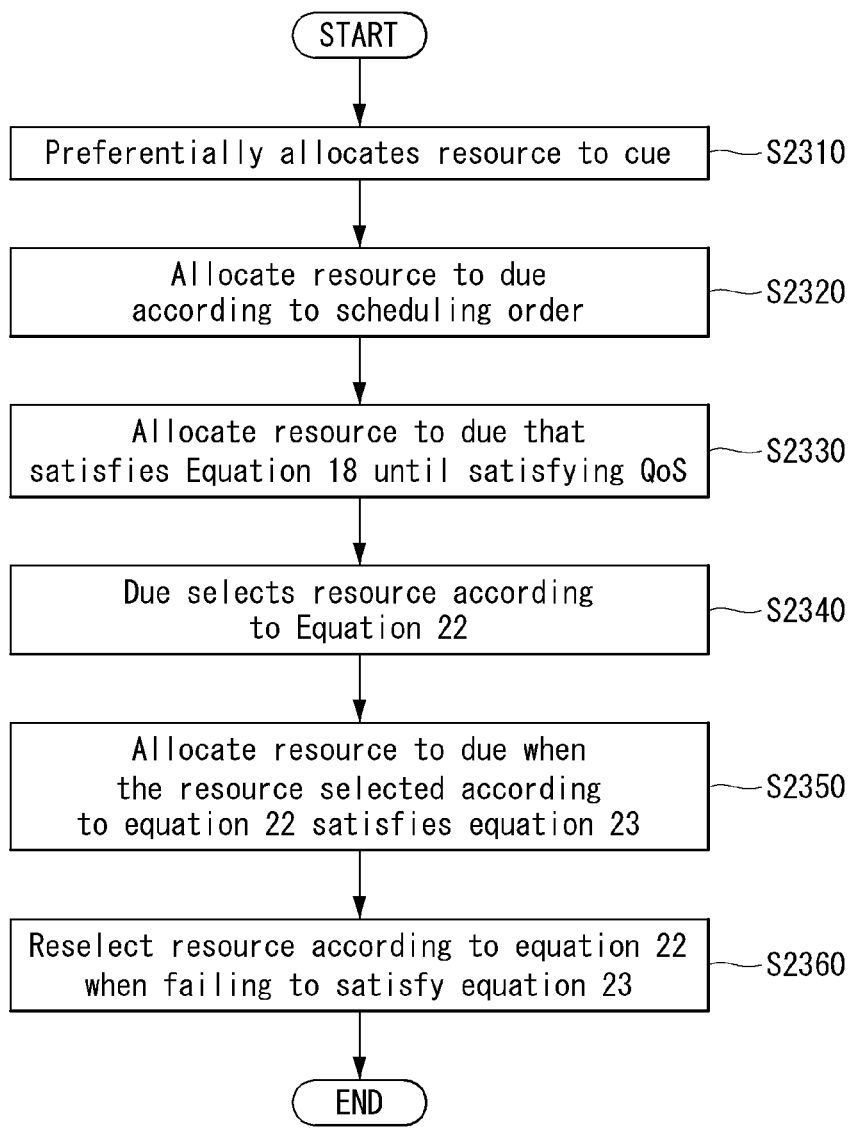
[FIG. 23]

【FIG. 24】

| RB1 |
|---|
| RB2 |
| RB3 |
| RB4 |
| RB5 |
| RB6 |
| RB7 |
| RB8 |

| CUE1 |
|---|
| CUE3 |
| CUE2 |
| CUE5 |
| CUE4 |
| CUE7 |
| CUE8 |
| CUE6 |

【FIG. 25】

| RB1 |
|---|
| RB2 |
| RB3 |
| RB4 |
| RB5 |
| RB6 |
| RB7 |
| RB8 |

| CUE1 | DUE1 → DUE2 | DUE5 |
|---|---|---|
| CUE3 | DUE3 | DUE6 |
| CUE2 | DUE8 | |
| CUE5 | DUE4 | DUE7 |
| CUE4 | | |
| CUE7 | | |
| CUE8 | | |
| CUE6 | | |

[FIG. 26]

| RB1 |
|-----|
| RB2 |
| RB3 |
| RB4 |
| RB5 |
| RB6 |
| RB7 |
| RB8 |

| CUE1 | DUE1 | DUE2 | DUE5 |      |
|------|------|------|------|------|
| CUE3 | DUE3 | DUE6 |      |      |
| CUE2 | DUE8 | DUE1 | DUE2 | DUE3 |
| CUE5 | DUE4 | DUE7 |      |      |
| CUE4 | DUE4 |      |      |      |
| CUE7 | DUE7 |      |      |      |
| CUE8 | DUE5 | DUE6 |      |      |
| CUE6 |      |      |      |      |

[FIG. 27]

| RB1 |
|-----|
| RB2 |
| RB3 |
| RB4 |
| RB5 |
| RB6 |
| RB7 |
| RB8 |

| CUE1 | DUE1 | DUE2 | DUE5 |      |
|------|------|------|------|------|
| CUE3 | DUE3 | DUE6 |      |      |
| CUE2 | DUE8 | DUE1 | DUE2 | DUE3 |
| CUE5 | DUE4 | DUE7 | DUE1 |      |
| CUE4 | DUE4 | DUE2 | DUE7 |      |
| CUE7 | DUE7 | DUE3 |      |      |
| CUE8 | DUE5 | DUE6 | DUE4 |      |
| CUE6 | DUE5 | DUE6 |      |      |

【FIG. 28】
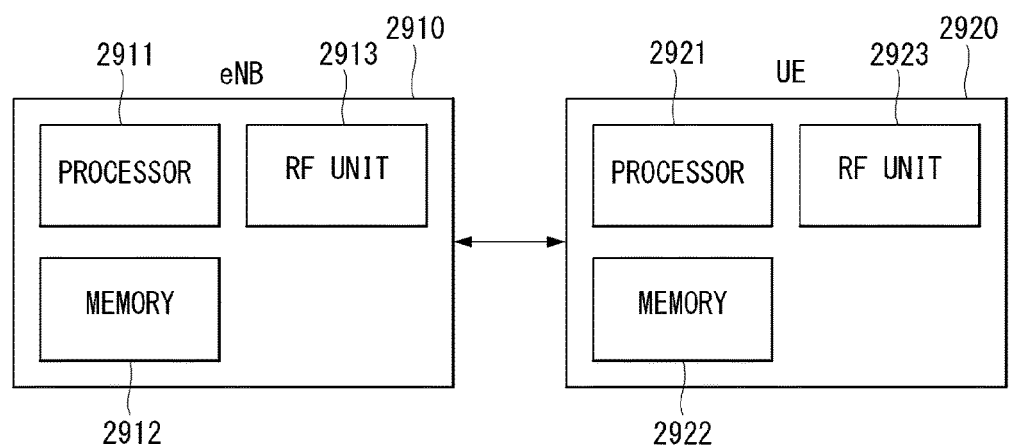
【FIG. 29】

METHOD FOR ASSIGNING RESOURCES IN WIRELESS COMMUNICATION SYSTEM SUPPORTING DEVICE-TO-DEVICE DIRECT COMMUNICATION, AND APPARATUS THEREFOR

CROSS-REFERENCE TO RELATED APPLICATIONS

This application is the National Stage filing under 35 U.S.C. 371 of International Application No. PCT/KR2015/002276, filed on Mar. 10, 2015, which claims the benefit of U.S. Provisional Application No. 61/951,489, filed on Mar. 11, 2014, the contents of which are all hereby incorporated by reference herein in their entirety.

TECHNICAL FIELD

The present invention relates to wireless communication systems supporting a direct communication between terminals, and more particularly, to a method for allocating resource in a wireless communication system that supports a device to device communication and an apparatus for supporting the same.

BACKGROUND ART

Mobile communication systems have been developed to provide a voice service while guaranteeing the activity of a user. The areas of the mobile communication systems are extended to a data service in addition to the voice service, and more developed mobile communication systems have been requested since the resources shortage is caused by the explosive increase of traffic and users request services of high speed.

Largely, requirements for the next generation mobile communication system include the acceptance of explosive data traffic, the revolutionary increase of transmission rate per user, the acceptance of the number of connection devices dramatically increased, very low End-to-End Latency and the support of high energy efficiency. In order to fulfill the requirements, various techniques have been researched such as the Dual Connectivity, the massive Multiple Input Multiple Output (MIMO), the In-band Full Duplex, the Non-Orthogonal Multiple Access, the support of Super wideband, the Device Networking, and the like.

DISCLOSURE

Technical Problem

An object of the present disclosure is to provide an efficient method for the allocation of resource for providing D2D terminals in the D2D communication on a cellular network.

In addition, another object of the present disclosure is to provide an efficient method for the allocation of resource for a cellular terminal and a D2D terminal by considering the position information and the transmission power of the cellular terminal and the D2D terminal.

In addition, another object of the present disclosure is to provide a method for allocating resource preferentially to a cellular terminal and making the resources be shared between D2D terminals for an efficient resource allocation.

The technical objects to attain in the present disclosure are not limited to the above-described technical objects and other technical objects which are not described herein will become apparent to those skilled in the art from the following description.

Technical Solution

In an aspect, a method for allocating resource performed by a base station in a wireless communication system that supports a direct communication between user equipments (UEs) includes acquiring position information and transmission power of a first UE and a second UE; and allocating the resource to the first UE and the second UE based on the acquired position information and transmission power of the first UE and the second UE, wherein allocating the resource preferentially allocates the resource to the first UE.

In addition, in the present disclosure, the resource is allocated to the first UE according to Equation below:

$$m^* = \arg\max_{m} SINR(k).$$

In addition, in the present disclosure, allocating the resource to the second UE further includes determining whether the resource selected by the second UE is proper according to Equation below:

$$\frac{P_{D_{n,r}D_{n,t}}(k)}{P_{C_m D_{n,r}}(k) + \sum_{i \neq t, i=1}^{N-1} P_{D_{n,r}D_{n,i}}(k) + N} > \kappa.$$

In addition, in the present disclosure, the resource selected by the second UE is selected according to Equation below:

$$k^* = \arg\max_{k \in \mathcal{R}} \left( \frac{P_{D_{n,r}D_{n,t}}(k)}{P^{(l)}_{C_m D_{n,r}}(k) + \sum_{i \neq t, i=1}^{N-1} \alpha P^{(l)}_{D_{n,r}D_{n,i}}(k) + N} \right).$$

In addition, in the present disclosure, when a use of the resource selected by the second UE is not proper, wherein the resource that is to be used by the second UE is selected among the resources except the resource in which the use of the resource is not proper according to Equation below:

$$k^* = \arg\max_{k \in \mathcal{R}} \left( \frac{P_{D_{n,r}D_{n,t}}(k)}{P^{(l)}_{C_m D_{n,r}}(k) + \sum_{i \neq t, i=1}^{N-1} \alpha P^{(l)}_{D_{n,r}D_{n,i}}(k) + N} \right).$$

In addition, in the present disclosure, a method for allocating resource performed by a second user equipment (UE) in a wireless communication system that supports a direct communication between UEs includes: being allocated with resource related to a D2D communication from a base station; selecting resource based on a path-loss with a first UE and a path-loss with another second UE among the allocated resources; and determining whether the use of the selected resource is proper.

In addition, in the present disclosure, selecting the resource is selected according to Equation below:

$$k^* = \arg\max_{k \in \mathcal{R}} \left( \frac{P_{D_{n,r}D_{n,t}}(k)}{P^{(l)}_{C_m D_{n,r}}(k) + \sum_{i \neq t, i=1}^{N-1} \alpha P^{(l)}_{D_{n,r}, D_{n,i}}(k) + N} \right).$$

In addition, in the present disclosure, determining whether the use of the selected resource is proper is performed according to Equation below:

$$\frac{P_{D_{n,r}D_{n,t}}(k)}{P_{C_m D_{n,r}}(k) + \sum_{i \neq t, i=1}^{N-1} P_{D_{n,r}, D_{n,i}}(k) + N} > \kappa.$$

In addition, in the present disclosure, when a use of the selected resource is not proper, wherein the resource that is to be used is selected among the resources except the resource in which the use of the resource is not proper according to Equation below:

$$k^* = \arg\max_{k \in \mathcal{R}} \left( \frac{P_{D_{n,r}D_{n,t}}(k)}{P^{(l)}_{C_m D_{n,r}}(k) + \sum_{i \neq t, i=1}^{N-1} \alpha P^{(l)}_{D_{n,r}, D_{n,i}}(k) + N} \right).$$

In addition, in the present disclosure, the first UE is a cellular UE that performs a communication with the base station, and the second UE is a D2D UE that performs a D2D communication with the base station.

In addition, in the present disclosure, a user equipment (UE) for being allocated with resource in a wireless communication system that supports a direct communication between UEs includes: a radio frequency (RF) unit for transmitting and receiving a radio signal; and a processor functionally connected to the RF unit, wherein the processor is configured to perform: being allocated with resource related to a D2D communication from a base station; selecting resource based on a path-loss with a cellular UE and a path-loss with another D2D UE among the allocated resources; and determining whether the use of the selected resource is proper.

Technical Effects

According to the present disclosure, there is an effect of maximizing the reuse of frequency in a cell by making resources be shared between D2D terminals.

In addition, according to the present disclosure, there is an effect of providing the most efficient method for the resource allocation by considering the predictive interference of other D2D terminals as a constraint condition when allocating resources to D2D terminals.

In addition, according to the present disclosure, a method for sharing resources between D2D terminals is provided, which may be applied to a potential sharing situation in addition to the sharing in a full overlapping situation of resources, and it may allow the regulation of power according to the degree of overlapping.

The technical effects of the present disclosure are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

FIG. 1 illustrates the structure of a radio frame in a wireless communication system to which the present invention may be applied.

FIG. 2 is a diagram illustrating a resource grid for a downlink slot in a wireless communication system to which the present invention may be applied.

FIG. 3 illustrates a structure of downlink subframe in a wireless communication system to which the present invention may be applied.

FIG. 4 illustrates a structure of uplink subframe in a wireless communication system to which the present invention may be applied.

FIG. 5 illustrates an example of the shape in which PUCCH formats are mapped to the PUCCH region of uplink physical resource block in a wireless communication system to which the present invention may be applied.

FIG. 6 illustrates a structure of CQI channel in the case of normal CP in a wireless communication system to which the present invention may be applied.

FIG. 7 illustrates a structure of ACK/NACK channel in the case of normal CP in a wireless communication system to which the present invention may be applied.

FIG. 8 illustrates an example of generating and transmitting five SC-FDMA symbols during a slot in a wireless communication system to which the present invention may be applied.

FIG. 9 illustrates an example of component carrier and carrier aggregation in a wireless communication system to which the present invention may be applied.

FIG. 10 illustrates an example of subframe structure according to cross carrier scheduling in a wireless communication system to which the present invention may be applied.

FIG. 11 illustrates an example of transmission channel processing of UL-SCH in a wireless communication system to which the present invention may be applied.

FIG. 12 illustrates an example of signal processing process of uplink shared channel which is a transport channel in a wireless communication system to which the present invention may be applied.

FIG. 13 is a diagram of a general multiple input multiple output (MIMO) antenna communication system.

FIG. 14 is a diagram illustrating the channel from multiple transmission antennas to a single reception antenna.

FIG. 15 illustrates a reference signal pattern mapped to a downlink resource block pair in a wireless communication system to which the present invention may be applied.

FIG. 16 illustrates an uplink subframe including a sounding reference signal symbol in a wireless communication system to which the present invention may be applied.

FIG. 17 illustrates a relay node resource partition in a wireless communication system to which the present invention may be applied.

FIG. 18 is a diagram for conceptually describing a D2D communication in a wireless communication system to which the present invention may be applied.

FIG. 19 illustrates an example of various scenarios in a D2D communication to which the method proposed in the present disclosure may be applied.

FIG. 20 illustrates an example in which discovery resource is allocated according to an embodiment of the present invention.

FIG. 21 is a diagram schematically illustrating a discovery process according to an embodiment of the present invention.

FIG. 22 is a diagram illustrating an example of an interference situation to which the resource allocation method proposed in the present disclosure may be applied.

FIG. 23 is a flowchart illustrating an example of a resource allocation method proposed in the present disclosure.

FIG. 24 is a diagram illustrating an example of allocating resource to a cellular UE according to FIG. 23.

FIGS. 25 to 28 are diagrams illustrating another example of a resource allocation method proposed in the present disclosure.

FIG. 29 illustrates an example of inner block diagram of a wireless communication apparatus to which the methods proposed in the present disclosure may be applied.

BEST MODE FOR INVENTION

Hereafter, preferred embodiments of the present invention will be described in detail with reference to the accompanying drawings. A detailed description to be disclosed hereinbelow together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an dvanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16(WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

FIG. 1(a) exemplifies radio frame structure type 1. The radio frame is constituted by 10 subframes. One subframe is constituted by 2 slots in a time domain. A time required to transmit one subframe is referred to as a transmissions time interval (TTI). For example, the length of one subframe may be 1 ms and the length of one slot may be 0.5 ms.

One slot includes a plurality of orthogonal frequency division multiplexing (OFDM) symbols in the time domain and includes multiple resource blocks (RBs) in a frequency domain. In 3GPP LTE, since OFDMA is used in downlink, the OFDM symbol is used to express one symbol period. The OFDM symbol may be one SC-FDMA symbol or symbol period. The resource block is a resource allocation wise and includes a plurality of consecutive subcarriers in one slot.

FIG. 1(b) illustrates frame structure type 2. Radio frame type 2 is constituted by 2 half frames, each half frame is constituted by 5 subframes, a downlink pilot time slot (DwPTS), a guard period (GP), and an uplink pilot time slot (UpPTS), and one subframe among them is constituted by 2 slots. The DwPTS is used for initial cell discovery, synchronization, or channel estimation in a terminal. The UpPTS is used for channel estimation in a base station and to match uplink transmission synchronization of the terminal. The guard period is a period for removing interference which occurs in uplink due to multi-path delay of a downlink signal between the uplink and the downlink.

In frame structure type 2 of a TDD system, an uplink-downlink configuration is a rule indicating whether the uplink and the downlink are allocated (alternatively, reserved) with respect to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each sub frame of the radio frame, 'D' represents a subframe for downlink transmission, 'U' represents a subframe for uplink transmission, and 'S' represents a special subframe constituted by three fields such as the DwPTS, the GP, and the UpPTS. The uplink-downlink configuration may be divided into 7 configurations and the positions and/or the numbers of the downlink subframe, the special subframe, and the uplink subframe may vary for each configuration.

A time when the downlink is switched to the uplink or a time when the uplink is switched to the downlink is referred to as a switching point. Switch-point periodicity means a period in which an aspect of the uplink subframe and the downlink subframe are switched is similarly repeated and both 5 ms or 10 ms are supported. When the period of the downlink-uplink switching point is 5 ms, the special subframe S is present for each half-frame and when the period of the downlink-uplink switching point is 5 ms, the special subframe S is present only in a first half-frame.

In all configurations, subframes #0 and #5 and the DwPTS are intervals only the downlink transmission. The UpPTS and a subframe just subsequently to the subframe are continuously intervals for the uplink transmission.

The uplink-downlink configuration may be known by both the base station and the terminal as system information. The base station transmits only an index of configuration information whenever the uplink-downlink configuration information is changed to announce a change of an uplink-downlink allocation state of the radio frame to the terminal. Further, the configuration information as a kind of downlink control information may be transmitted through a physical downlink control channel (PDCCH) similarly to other scheduling information and may be commonly transmitted to all terminals in a cell through a broadcast channel as broadcasting information.

The structure of the radio frame is just one example and the number subcarriers included in the radio frame or the number of slots included in the subframe and the number of OFDM symbols included in the slot may be variously changed.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 sub-carriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

Physical Uplink Control Channel (PUCCH)

The uplink control information (UCI) transmitted through the PUCCH may include a scheduling request (SR), HARQ ACK/NACK information, and downlink channel measurement information.

The HARQ ACK/NACK information may be generated according to a downlink data packet on the PDSCH is successfully decoded. In the existing wireless communication system, 1 bit is transmitted as ACK/NACK information with respect to downlink single codeword transmission and 2 bits are transmitted as the ACK/NACK information with respect to downlink 2-codeword transmission.

The channel measurement information which designates feedback information associated with a multiple input multiple output (MIMO) technique may include a channel quality indicator (CQI), a precoding matrix index (PMI), and a rank indicator (RI). The channel measurement information may also be collectively expressed as the CQI.

20 bits may be used per subframe for transmitting the CQI.

The PUCCH may be modulated by using binary phase shift keying (BPSK) and quadrature phase shift keying (QPSK) techniques. Control information of a plurality of terminals may be transmitted through the PUCCH and when code division multiplexing (CDM) is performed to distinguish signals of the respective terminals, a constant amplitude zero autocorrelation (CAZAC) sequence having a length of 12 is primary used. Since the CAZAC sequence has a characteristic to maintain a predetermined amplitude in the time domain and the frequency domain, the CAZAC sequence has a property suitable for increasing coverage by decreasing a peak-to-average power ratio (PAPR) or cubic metric (CM) of the terminal. Further, the ACK/NACK information for downlink data transmission performed through the PUCCH is covered by using an orthogonal sequence or an orthogonal cover (OC).

Further, the control information transmitted on the PUCCH may be distinguished by using a cyclically shifted sequence having different cyclic shift (CS) values. The cyclically shifted sequence may be generated by cyclically shifting a base sequence by a specific cyclic shift (CS) amount. The specific CS amount is indicated by the cyclic shift (CS) index. The number of usable cyclic shifts may vary depending on delay spread of the channel. Various types of sequences may be used as the base sequence the CAZAC sequence is one example of the corresponding sequence.

Further, the amount of control information which the terminal may transmit in one subframe may be determined according to the number (that is, SC-FDMA symbols other an SC-FDMA symbol used for transmitting a reference signal (RS) for coherent detection of the PUCCH) of SC-FDMA symbols which are usable for transmitting the control information.

In the 3GPP LTE system, the PUCCH is defined as a total of 7 different formats according to the transmitted control information, a modulation technique, the amount of control information, and the like and an attribute of the uplink control information (UCI) transmitted according to each PUCCH format may be summarized as shown in Table 2 given below.

TABLE 2

| PUCCH Format | Uplink Control Information(UCI) |
| --- | --- |
| Format 1 | Scheduling Request(SR)(unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

PUCCH format 1 is used for transmitting only the SR. A waveform which is not modulated is adopted in the case of transmitting only the SR and this will be described below in detail.

PUCCH format 1a or 1b is used for transmitting the HARQ ACK/NACK. PUCCH format 1a or 1b may be used when only the HARQ ACK/NACK is transmitted in a predetermined subframe. Alternatively, the HARQ ACK/NACK and the SR may be transmitted in the same subframe by using PUCCH format 1a or 1b.

PUCCH format 2 is used for transmitting the CQI and PUCCH format 2a or 2b is used for transmitting the CQI and the HARQ ACK/NACK.

In the case of an extended CP, PUCCH format 2 may be transmitted for transmitting the CQI and the HARQ ACK/NACK.

FIG. 5 illustrates one example of a type in which PUCCH formats are mapped to a PUCCH region of an uplink physical resource block in the wireless communication system to which the present invention can be applied.

In FIG. 5, $N_{RB}^{UL}$ represents the number of resource blocks in the uplink and $0, 1, \ldots, N_{RB}^{UL}-1$ mean numbers of physical resource blocks. Basically, the PUCCH is mapped to both edges of an uplink frequency block. As illustrated in FIG. 5, PUCCH format 2/2a/2b is mapped to a PUCCH region expressed as m=0, 1 and this may be expressed in such a manner that PUCCH format 2/2a/2b is mapped to resource blocks positioned at a band edge. Further, both PUCCH format 2/2a/2b and PUCCH format 1/1a/1b may be mixedly mapped to a PUCCH region expressed as m=2. Next, PUCCH format 1/1a/1b may be mapped to a PUCCH region expressed as m=3, 4, and 5. The number ($N_{RB}^{(2)}$) of PUCCH RBs which are usable by PUCCH format 2/2a/2b may be indicated to terminals in the cell by broadcasting signaling.

PUCCH format 2/2a/2b is described. PUCCH format 2/2a/2b is a control channel for transmitting channel measurement feedback (CQI, PMI, and RI).

A reporting period of the channel measurement feedbacks (hereinafter, collectively expressed as CQI information) and a frequency wise (alternatively, a frequency resolution) to be measured may be controlled by the base station. In the time domain, periodic and aperiodic CQI reporting may be supported. PUCCH format 2 may be used for only the periodic reporting and the PUSCH may be used for aperiodic reporting. In the case of the aperiodic reporting, the base station may instruct the terminal to transmit a scheduling resource loaded with individual CQI reporting for the uplink data transmission.

FIG. 6 illustrates a structure of a CQI channel in the case of a general CP in the wireless communication system to which the present invention can be applied.

In SC-FDMA symbols 0 to 6 of one slot, SC-FDMA symbols 1 and 5 (second and sixth symbols) may be used for transmitting a demodulation reference signal and the CQI information may be transmitted in the residual SC-FDMA symbols. Meanwhile, in the case of the extended CP, one SC-FDMA symbol (SC-FDMA symbol 3) is used for transmitting the DMRS.

In PUCCH format 2/2a/2b, modulation by the CAZAC sequence is supported and the CAZAC sequence having the length of 12 is multiplied by a QPSK-modulated symbol. The cyclic shift (CS) of the sequence is changed between the symbol and the slot. The orthogonal covering is used with respect to the DMRS.

The reference signal (DMRS) is loaded on two SC-FDMA symbols separated from each other by 3 SC-FDMA symbols among 7 SC-FDMA symbols included in one slot and the CQI information is loaded on 5 residual SC-FDMA symbols. Two RSs are used in one slot in order to support a high-speed terminal. Further, the respective terminals are distinguished by using the CS sequence. CQI information symbols are modulated and transferred to all SC-FDMA symbols and the SC-FDMA symbol is constituted by one sequence. That is, the terminal modulates and transmits the CQI to each sequence.

The number of symbols which may be transmitted to one TTI is 10 and modulation of the CQI information is determined up to QPSK. When QPSK mapping is used for the SC-FDMA symbol, since a CQI value of 2 bits may be loaded, a CQI value of 10 bits may be loaded on one slot. Therefore, a CQI value of a maximum of 20 bits may be loaded on one subframe. A frequency domain spread code is used for spreading the CQI information in the frequency domain.

The CAZAC sequence (for example, ZC sequence) having the length of 12 may be used as the frequency domain spread code. CAZAC sequences having different CS values may be applied to the respective control channels to be distinguished from each other. IFFT is performed with respect to the CQI information in which the frequency domain is spread.

12 different terminals may be orthogonally multiplexed on the same PUCCH RB by a cyclic shift having 12 equivalent intervals. In the case of a general CP, a DMRS sequence on SC-FDMA symbol 1 and 5 (on SC-FDMA symbol 3 in the case of the extended CP) is similar to a CQI signal sequence on the frequency domain, but the modulation of the CQI information is not adopted.

The terminal may be semi-statically configured by upper-layer signaling so as to periodically report different CQI, PMI, and RI types on PUCCH resources indicated as PUCCH resource indexes ($n_{PUCCH}^{(1,\tilde{p})}$, $n_{PUCCH}^{(2,\tilde{p})}$, and $n_{PUCCH}^{(3,\tilde{p})}$). Herein, the PUCCH resource index ($n_{PUCCH}^{(2,\tilde{p})}$) is information indicating the PUCCH region used for PUCCH format 2/2a/2b and a CS value to be used.

PUCCH Channel Structure

PUCCH formats 1a and 1b are described.

In PUCCH format 1a and 1b, the CAZAC sequence having the length of 12 is multiplied by a symbol modulated by using a BPSK or QPSK modulation scheme. For example, a result acquired by multiplying a modulated symbol d(0) by a CAZAC sequence r(n) (n=0, 1, 2, ..., N−1) having a length of N becomes y(0), y(1), y(2), ..., y(N−1). y(0), ..., y(N−1) symbols may be designated as a block of symbols. The modulated symbol is multiplied by the CAZAC sequence and thereafter, the block-wise spread using the orthogonal sequence is adopted.

A Hadamard sequence having a length of 4 is used with respect to general ACK/NACK information and a discrete Fourier transform (DFT) sequence having a length of 3 is used with respect to the ACK/NACK information and the reference signal.

The Hadamard sequence having the length of 2 is used with respect to the reference signal in the case of the extended CP.

FIG. 7 illustrates a structure of an ACK/NACK channel in the case of a general CP in the wireless communication system to which the present invention can be applied.

In FIG. 7, a PUCCH channel structure for transmitting the HARQ ACK/NACK without the CQI is exemplarily illustrated.

The reference signal (DMRS) is loaded on three consecutive SC-FDMA symbols in a middle part among 7 SC-FDMA symbols and the ACK/NACK signal is loaded on 4 residual SC-FDMA symbols.

Meanwhile, in the case of the extended CP, the RS may be loaded on two consecutive symbols in the middle part. The number of and the positions of symbols used in the RS may vary depending on the control channel and the numbers and the positions of symbols used in the ACK/NACK signal associated with the positions of symbols used in the RS may also correspondingly vary depending on the control channel.

Acknowledgment response information (not scrambled status) of 1 bit and 2 bits may be expressed as one HARQ ACK/NACK modulated symbol by using the BPSK and QPSK modulation techniques, respectively. A positive acknowledgement response (ACK) may be encoded as '1' and a negative acknowledgment response (NACK) may be encoded as '0'.

When a control signal is transmitted in an allocated band, 2-dimensional (D) spread is adopted in order to increase a multiplexing capacity. That is, frequency domain spread and time domain spread are simultaneously adopted in order to increase the number of terminals or control channels which may be multiplexed.

A frequency domain sequence is used as the base sequence in order to spread the ACK/NACK signal in the frequency domain. A Zadoff-Chu (ZC) sequence which is one of the CAZAC sequences may be used as the frequency domain sequence. For example, different CSs are applied to the ZC sequence which is the base sequence, and as a result, multiplexing different terminals or different control channels may be applied. The number of CS resources supported in an SC-FDMA symbol for PUCCH RBs for HARQ ACK/

NACK transmission is set by a cell-specific upper-layer signaling parameter ($\Delta_{shift}^{PUCCH}$).

The ACK/NACK signal which is frequency-domain spread is spread in the time domain by using an orthogonal spreading code. As the orthogonal spreading code, a Walsh-Hadamard sequence or DFT sequence may be used. For example, the ACK/NACK signal may be spread by using an orthogonal sequence (w0, w1, w2, and w3) having the length of 4 with respect to 4 symbols. Further, the RS is also spread through an orthogonal sequence having the length of 3 or 2. This is referred to as orthogonal covering (OC).

Multiple terminals may be multiplexed by a code division multiplexing (CDM) scheme by using the CS resources in the frequency domain and the OC resources in the time domain described above. That is, ACK/NACK information and RSs of a lot of terminals may be multiplexed on the same PUCCH RB.

In respect to the time-domain spread CDM, the number of spreading codes supported with respect to the ACK/NACK information is limited by the number of RS symbols. That is, since the number of RS transmitting SC-FDMA symbols is smaller than that of ACK/NACK information transmitting SC-FDMA symbols, the multiplexing capacity of the RS is smaller than that of the ACK/NACK information.

For example, in the case of the general CP, the ACK/NACK information may be transmitted in four symbols and not 4 but 3 orthogonal spreading codes are used for the ACK/NACK information and the reason is that the number of RS transmitting symbols is limited to 3 to use only 3 orthogonal spreading codes for the RS.

In the case of the subframe of the general CP, when 3 symbols are used for transmitting the RS and 4 symbols are used for transmitting the ACK/NACK information in one slot, for example, if 6 CSs in the frequency domain and 3 orthogonal cover (OC) resources may be used, HARQ acknowledgement responses from a total of 18 different terminals may be multiplexed in one PUCCH RB. In the case of the subframe of the extended CP, when 2 symbols are used for transmitting the RS and 4 symbols are used for transmitting the ACK/NACK information in one slot, for example, if 6 CSs in the frequency domain and 2 orthogonal cover (OC) resources may be used, the HARQ acknowledgement responses from a total of 12 different terminals may be multiplexed in one PUCCH RB.

Next, PUCCH format 1 is described. The scheduling request (SR) is transmitted by a scheme in which the terminal requests scheduling or does not request the scheduling. An SR channel reuses an ACK/NACK channel structure in PUCCH format 1a/1b and is configured by an on-off keying (OOK) scheme based on an ACK/NACK channel design. In the SR channel, the reference signal is not transmitted. Therefore, in the case of the general CP, a sequence having a length of 7 is used and in the case of the extended CP, a sequence having a length of 6 is used. Different cyclic shifts (CSs) or orthogonal covers (OCs) may be allocated to the SR and the ACK/NACK. That is, the terminal transmits the HARQ ACK/NACK through a resource allocated for the SR in order to transmit a positive SR. The terminal transmits the HARQ ACK/NACK through a resource allocated for the ACK/NACK in order to transmit a negative SR.

Next, an enhanced-PUCCH (e-PUCCH) format is described. An e-PUCCH may correspond to PUCCH format 3 of an LTE-A system. A block spreading technique may be applied to ACK/NACK transmission using PUCCH format 3.

The block spreading technique is a scheme that modulates transmission of the control signal by using the SC-FDMA scheme unlike the existing PUCCH format 1 series or 2 series. As illustrated in FIG. 8, a symbol sequence may be spread and transmitted on the time domain by using an orthogonal cover code (OCC). The control signals of the plurality of terminals may be multiplexed on the same RB by using the OCC. In the case of PUCCH format 2 described above, one symbol sequence is transmitted throughout the time domain and the control signals of the plurality of terminals are multiplexed by using the cyclic shift (CS) of the CAZAC sequence, while in the case of a block spreading based on PUCCH format (for example, PUCCH format 3), one symbol sequence is transmitted throughout the frequency domain and the control signals of the plurality of terminals are multiplexed by using the time domain spreading using the OCC.

FIG. 8 illustrates one example of generating and transmitting 5 SC-FDMA symbols during one slot in the wireless communication system to which the present invention can be applied.

In FIG. 8, an example of generating and transmitting 5 SC-FDMA symbols (that is, data part) by using an OCC having the length of 5 (alternatively, SF=5) in one symbol sequence during one slot. In this case, two RS symbols may be used during one slot.

In the example of FIG. 8, the RS symbol may be generated from a CAZAC sequence to which a specific cyclic shift value is applied and transmitted in a type in which a predetermined OCC is applied (alternatively, multiplied) throughout a plurality of RS symbols. Further, in the example of FIG. 8, when it is assumed that 12 modulated symbols are used for each OFDM symbol (alternatively, SC-FDMA symbol) and the respective modulated symbols are generated by QPSK, the maximum bit number which may be transmitted in one slot becomes 24 bits (=12×2). Accordingly, the bit number which is transmittable by two slots becomes a total of 48 bits. When a PUCCH channel structure of the block spreading scheme is used, control information having an extended size may be transmitted as compared with the existing PUCCH format 1 series and 2 series.

General Carrier Aggregation

A communication environment considered in embodiments of the present invention includes multi-carrier supporting environments. That is, a multi-carrier system or a carrier aggregation system used in the present invention means a system that aggregates and uses one or more component carriers (CCs) having a smaller bandwidth smaller than a target band at the time of configuring a target wideband in order to support a wideband.

In the present invention, multi-carriers mean aggregation of (alternatively, carrier aggregation) of carriers and in this case, the aggregation of the carriers means both aggregation between continuous carriers and aggregation between non-contiguous carriers. Further, the number of component carriers aggregated between the downlink and the uplink may be differently set. A case in which the number of downlink component carriers (hereinafter, referred to as 'DL CC') and the number of uplink component carriers (hereinafter, referred to as 'UL CC') are the same as each other is referred to as symmetric aggregation and a case in which the number of downlink component carriers and the number of uplink component carriers are different from each other is referred to as asymmetric aggregation. The carrier aggregation may be used mixedly with a term such as the carrier aggregation, the bandwidth aggregation, spectrum aggregation, or the like.

The carrier aggregation configured by combining two or more component carriers aims at supporting up to a bandwidth of 100 MHz in the LTE-A system. When one or more carriers having the bandwidth than the target band are combined, the bandwidth of the carriers to be combined may be limited to a bandwidth used in the existing system in order to maintain backward compatibility with the existing IMT system. For example, the existing 3GPP LTE system supports bandwidths of 1.4, 3, 5, 10, 15, and 20 MHz and a 3GPP LTE-advanced system (that is, LTE-A) may be configured to support a bandwidth larger than 20 MHz by using on the bandwidth for compatibility with the existing system. Further, the carrier aggregation system used in the preset invention may be configured to support the carrier aggregation by defining a new bandwidth regardless of the bandwidth used in the existing system.

The LTE-A system uses a concept of the cell in order to manage a radio resource.

The carrier aggregation environment may be called a multi-cell environment. The cell is defined as a combination of a pair of a downlink resource (DL CC) and an uplink resource (UL CC), but the uplink resource is not required. Therefore, the cell may be constituted by only the downlink resource or both the downlink resource and the uplink resource. When a specific terminal has only one configured serving cell, the cell may have one DL CC and one UL CC, but when the specific terminal has two or more configured serving cells, the cell has DL CCs as many as the cells and the number of UL CCs may be equal to or smaller than the number of DL CCs.

Alternatively, contrary to this, the DL CC and the UL CC may be configured. That is, when the specific terminal has multiple configured serving cells, a carrier aggregation environment having UL CCs more than DL CCs may also be supported. That is, the carrier aggregation may be appreciated as aggregation of two or more cells having different carrier frequencies (center frequencies). Herein, the described 'cell' needs to be distinguished from a cell as an area covered by the base station which is generally used.

The cell used in the LTE-A system includes a primary cell (PCell) and a secondary cell (SCell. The P cell and the S cell may be used as the serving cell. In a terminal which is in an RRC_CONNECTED state, but does not have the configured carrier aggregation or does not support the carrier aggregation, only one serving constituted by only the P cell is present. On the contrary, in a terminal which is in the RRC_CONNECTED state and has the configured carrier aggregation, one or more serving cells may be present and the P cell and one or more S cells are included in all serving cells.

The serving cell (P cell and S cell) may be configured through an RRC parameter. PhysCellId as a physical layer identifier of the cell has integer values of 0 to 503. SCellIndex as a short identifier used to identify the S cell has integer values of 1 to 7. ServCellIndex as a short identifier used to identify the serving cell (P cell or S cell) has the integer values of 0 to 7. The value of 0 is applied to the P cell and SCellIndex is previously granted for application to the S cell. That is, a cell having a smallest cell ID (alternatively, cell index) in ServCellIndex becomes the P cell.

The P cell means a cell that operates on a primary frequency (alternatively, primary CC). The terminal may be used to perform an initial connection establishment process or a connection re-establishment process and may be designated as a cell indicated during a handover process. Further, the P cell means a cell which becomes the center of control associated communication among serving cells configured in the carrier aggregation environment. That is, the terminal may be allocated with and transmit the PUCCH only in the P cell thereof and use only the P cell to acquire the system information or change a monitoring procedure. An evolved universal terrestrial radio access (E-UTRAN) may change only the P cell for the handover procedure to the terminal supporting the carrier aggregation environment by using an RRC connection reconfiguration message (RRC-ConnectionReconfigutaion) message of an upper layer including mobile control information (mobilityControlInfo).

The S cell means a cell that operates on a secondary frequency (alternatively, secondary CC). Only one P cell may be allocated to a specific terminal and one or more S cells may be allocated to the specific terminal. The S cell may be configured after RRC connection establishment is achieved and used for providing an additional radio resource. The PUCCH is not present in residual cells other than the P cell, that is, the S cells among the serving cells configured in the carrier aggregation environment. The E-UTRAN may provide all system information associated with a related cell which is in an RRC_CONNECTED state through a dedicated signal at the time of adding the S cells to the terminal that supports the carrier aggregation environment. A change of the system information may be controlled by releasing and adding the related S cell and in this case, the RRC connection reconfiguration (RRCConnectionReconfigutaion) message of the upper layer may be used. The E-UTRAN may perform having different parameters for each terminal rather than broadcasting in the related S cell.

After an initial security activation process starts, the E-UTRAN adds the S cells to the P cell initially configured during the connection establishment process to configure a network including one or more S cells. In the carrier aggregation environment, the P cell and the S cell may operate as the respective component carriers. In an embodiment described below, the primary component carrier (PCC) may be used as the same meaning as the P cell and the secondary component carrier (SCC) may be used as the same meaning as the S cell.

FIG. 9 illustrates examples of a component carrier and carrier aggregation in the wireless communication system to which the present invention can be applied.

FIG. 9a illustrates a single carrier structure used in an LTE system. The component carrier includes the DL CC and the UL CC. One component carrier may have a frequency range of 20 MHz.

FIG. 9b illustrates a carrier aggregation structure used in the LTE system. In the case of FIG. 9b, a case is illustrated, in which three component carriers having a frequency magnitude of 20 MHz are combined. Each of three DL CCs and three UL CCs is provided, but the number of DL CCs and the number of UL CCs are not limited. In the case of carrier aggregation, the terminal may simultaneously monitor three CCs, and receive downlink signal/data and transmit uplink signal/data.

When N DL CCs are managed in a specific cell, the network may allocate M (M≤N) DL CCs to the terminal. In this case, the terminal may monitor only M limited DL CCs and receive the DL signal. Further, the network gives L (L≤M≤N) DL CCs to allocate a primary DL CC to the terminal and in this case, UE needs to particularly monitor L DL CCs. Such a scheme may be similarly applied even to uplink transmission.

A linkage between a carrier frequency (alternatively, DL CC) of the downlink resource and a carrier frequency (alternatively, UL CC) of the uplink resource may be indicated by an upper-layer message such as the RRC message or the system information. For example, a combination of the DL resource and the UL resource may be configured by a linkage defined by system information block type 2 (SIB2). In detail, the linkage may mean a mapping relationship between the DL CC in which the PDCCH transporting a UL grant and a UL CC using the UL grant and mean a mapping relationship between the DL CC (alternatively, UL CC) in which data for the HARQ is transmitted and the UL CC (alternatively, DL CC) in which the HARQ ACK/NACK signal is transmitted.

Cross Carrier Scheduling

In the carrier aggregation system, in terms of scheduling for the carrier or the serving cell, two types of a self-scheduling method and a cross carrier scheduling method are provided. The cross carrier scheduling may be called cross component carrier scheduling or cross cell scheduling.

The cross carrier scheduling means transmitting the PDCCH (DL grant) and the PDSCH to different respective DL CCs or transmitting the PUSCH transmitted according to the PDCCH (UL grant) transmitted in the DL CC through other UL CC other than a UL CC linked with the DL CC receiving the UL grant.

Whether to perform the cross carrier scheduling may be UE-specifically activated or deactivated and semi-statically known for each terminal through the upper-layer signaling (for example, RRC signaling).

When the cross carrier scheduling is activated, a carrier indicator field (CIF) indicating through which DL/UL CC the PDSCH/PUSCH the PDSCH/PUSCH indicated by the corresponding PDCCH is transmitted is required. For example, the PDCCH may allocate the PDSCH resource or the PUSCH resource to one of multiple component carriers by using the CIF. That is, the CIF is set when the PDSCH or PUSCH resource is allocated to one of DL/UL CCs in which the PDCCH on the DL CC is multiply aggregated. In this case, a DCI format of LTE-A Release-8 may extend according to the CIF. In this case, the set CIF may be fixed to a 3-bit field and the position of the set CIF may be fixed regardless of the size of the DCI format. Further, a PDCCH structure (the same coding and the same CCE based resource mapping) of the LTE-A Release-8 may be reused.

On the contrary, when the PDCCH on the DL CC allocates the PDSCH resource on the same DL CC or allocates the PUSCH resource on a UL CC which is singly linked, the CIF is not set. In this case, the same PDCCH structure (the same coding and the same CCE based resource mapping) and DCI format as the LTE-A Release-8 may be used.

When the cross carrier scheduling is possible, the terminal needs to monitor PDCCHs for a plurality of DCIs in a control region of a monitoring CC according to a transmission mode and/or a bandwidth for each CC. Therefore, a configuration and PDCCH monitoring of a search space which may support monitoring the PDCCHs for the plurality of DCIs are required.

In the carrier aggregation system, a terminal DL CC aggregate represents an aggregate of DL CCs in which the terminal is scheduled to receive the PDSCH and a terminal UL CC aggregate represents an aggregate of UL CCs in which the terminal is scheduled to transmit the PUSCH. Further, a PDCCH monitoring set represents a set of one or more DL CCs that perform the PDCCH monitoring. The PDCCH monitoring set may be the same as the terminal DL CC set or a subset of the terminal DL CC set. The PDCCH monitoring set may include at least any one of DL CCs in the terminal DL CC set. Alternatively, the PDCCH monitoring set may be defined separately regardless of the terminal DL CC set. The DL CCs included in the PDCCH monitoring set may be configured in such a manner that self-scheduling for the linked UL CC is continuously available. The terminal DL CC set, the terminal UL CC set, and the PDCCH monitoring set may be configured UE-specifically, UE group-specifically, or cell-specifically.

When the cross carrier scheduling is deactivated, the deactivation of the cross carrier scheduling means that the PDCCH monitoring set continuously means the terminal DL CC set and in this case, an indication such as separate signaling for the PDCCH monitoring set is not required. However, when the cross carrier scheduling is activated, the PDCCH monitoring set is preferably defined in the terminal DL CC set. That is, the base station transmits the PDCCH through only the PDCCH monitoring set in order to schedule the PDSCH or PUSCH for the terminal.

FIG. 10 illustrates one example of a subframe structure depending on cross carrier scheduling in the wireless communication system to which the present invention can be applied.

Referring to FIG. 10, a case is illustrated, in which three DL CCs are associated with a DL subframe for an LTE-A terminal and DL CC'A' is configured as a PDCCH monitoring DL CC. When the CIF is not used, each DL CC may transmit the PDCCH scheduling the PDSCH thereof without the CIF. On the contrary, when the CIF is used through the upper-layer signaling, only one DL CC 'A' may transmit the PDCCH scheduling the PDSCH thereof or the PDSCH of another CC by using the CIF. In this case, DL CC 'B' and 'C' in which the PDCCH monitoring DL CC is not configured does not transmit the PDCCH.

General ACK/NACK Multiplexing Method

In a situation in which the terminal simultaneously needs to transmit multiple ACKs/NACKs corresponding to multiple data units received from an eNB, an ACK/NACK multiplexing method based on PUCCH resource selection may be considered in order to maintain a single-frequency characteristic of the ACK/NACK signal and reduce ACK/NACK transmission power.

Together with ACK/NACK multiplexing, contents of ACK/NACK responses for multiple data units may be identified by combining a PUCCH resource and a resource of QPSK modulation symbols used for actual ACK/NACK transmission.

For example, when one PUCCH resource may transmit 4 bits and four data units may be maximally transmitted, an ACK/NACK result may be identified in the eNB as shown in Table 3 given below.

TABLE 3

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |

TABLE 3-continued

| HARQ-ACK(0), HARQ-ACK(1), HARQ-ACK(2), HARQ-ACK(3) | $n_{PUCCH}^{(1)}$ | b(0), b(1) |
|---|---|---|
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In Table 3 given above, HARQ-ACK(i) represents an ACK/NACK result for an i-th data unit. In Table 3 given above, discontinuous transmission (DTX) means that there is no data unit to be transmitted for the corresponding HARQ-ACK(i) or that the terminal may not detect the data unit corresponding to the HARQ-ACK(i).

According to Table 3 given above, a maximum of four PUCCH resources ($n_{PUCCH,0}^{(1)}$, $n_{PUCCH,1}^{(1)}$, $n_{PUCCH,2}^{(1)}$, and $n_{PUCCH,3}^{(1)}$) are provided and b(0) and b(1) are two bits transmitted by using a selected PUCCH.

For example, when the terminal successfully receives all of four data units, the terminal transmits 2 bits (1,1) by using $n_{PUCCH,1}^{(1)}$.

When the terminal fails to decoding in first and third data units and succeeds in decoding in second and fourth data units, the terminal transmits bits (1,0) by using $n_{PUCCH,3}^{(1)}$.

In ACK/NACK channel selection, when there is at least one ACK, the NACK and the DTX are coupled with each other. The reason is that a combination of the PUCCH resource and the QPSK symbol may not all ACK/NACK states. However, when there is no ACK, the DTX is decoupled from the NACK.

In this case, the PUCCH resource linked to the data unit corresponding to one definite NACK may also be reserved to transmit signals of multiple ACKs/NACKs.

Validation of PDCCH for Semi-Persistent Scheduling

Semi-persistent scheduling (SPS) is a scheduling scheme that allocates the resource to the terminal to be persistently maintained during a specific time interval.

When a predetermined amount of data is transmitted for a specific time like a voice over Internet protocol (VoIP), since the control information need not be transmitted every data transmission interval for the resource allocation, the waste of the control information may be reduced by using the SPS scheme. In a so-called semi-persistent scheduling (SPS) method, a time resource domain in which the resource may be allocated to the terminal is preferentially allocated.

In this case, in a semi-persistent allocation method, a time resource domain allocated to a specific terminal may be configured to have periodicity. Then, a frequency resource domain is allocated as necessary to complete allocation of the time-frequency resource. Allocating the frequency resource domain may be designated as so-called activation. When the semi-persistent allocation method is used, since the resource allocation is maintained during a predetermined period by one-time signaling, the resource need not be repeatedly allocated, and as a result, signaling overhead may be reduced.

Thereafter, since the resource allocation to the terminal is not required, signaling for releasing the frequency resource allocation may be transmitted from the base station to the terminal. Releasing the allocation of the frequency resource domain may be designated as deactivation.

In current LTE, in which subframes the SPS is first transmitted/received through radio resource control (RRC) signaling for the SPS for the uplink and/or downlink is announced to the terminal. That is, the time resource is preferentially designated among the time and frequency resources allocated for the SPS through the RRC signaling. In order to announce a usable subframe, for example, a period and an offset of the subframe may be announced. However, since the terminal is allocated with only the time resource domain through the RRC signaling, even though the terminal receives the RRC signaling, the terminal does not immediately perform transmission and reception by the SPS and the terminal allocates the frequency resource domain as necessary to complete the allocation of the time-frequency resource. Allocating the frequency resource domain may be designated as deactivation and releasing the allocation of the frequency resource domain may be designated as deactivation.

Therefore, the terminal receives the PDCCH indicating the activation and thereafter, allocate the frequency resource according to RB allocation information included in the received PDCCH and applies modulation and code rate depending on modulation and coding scheme (MCS) information to start transmission and reception according to the period and the offset of the subframe allocated through the RRC signaling.

Next, when the terminal receives the PDCCH announcing the deactivation from the base station, the terminal stops transmission and reception. When the terminal receives the PDCCH indicating the activation or reactivation after stopping the transmission and reception, the terminal resumes the transmission and reception again with the period and the offset of the subframe allocated through the RRC signaling by using the RC allocation, the MCS, and the like designated by the PDCCH. That is, the time resource is performed through the RRC signaling, but the signal may be actually transmitted and received after receiving the PDCCH indicating the activation and reactivation of the SPS and the signal transmission and reception stop after receiving the PDCCH indicating the deactivation of the SPS.

When all conditions described below are satisfied, the terminal may validate a PDCCH including an SPS indication. First, a CRC parity bit added for a PDCCH payload needs to be scrambled with an SPS C-RNTI and second, a new data indicator (NDI) field needs to be set to 0. Herein, in the case of DCI formats 2, 2A, 2B, and 2C, the new data indicator field indicates one activated transmission block.

In addition, when each field used in the DCI format is set according to Tables 4 and 5 given below, the validation is completed. When the validation is completed, the terminal recognizes that received DCI information is valid SPS activation or deactivation (alternatively, release). On the contrary, when the validation is not completed, the terminal recognizes that a non-matching CRC is included in the received DCI format.

Table 4 shows a field for validating the PDCCH indicating the SPS activation.

TABLE 4

| | CI format 0 | DCI format 1/1A | DCI format 2/2A/2B |
|---|---|---|---|
| TPC command for scheduled PUSCH | set to '00' | N/A | N/A |
| Cyclic shift DM RS | set to '000' | N/A | N/A |

TABLE 4-continued

|  | CI format 0 | DCI format 1/1A | DCI format 2/2A/2B |
|---|---|---|---|
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 5 shows a field for validating the PDCCH indicating the SPS deactivation (alternatively, release).

TABLE 5

|  | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

When the DCI format indicates SPS downlink scheduling activation, a TPC command value for the PUCCH field may be used as indexes indicating four PUCCH resource values set by the upper layer.

PUCCH Piggybacking in Rel-8 LTE

FIG. 11 illustrates one example of transport channel processing of a UL-SCH in the wireless communication system to which the present invention can be applied.

In a 3GPP LTE system (=E-UTRA, Rel. 8), in the case of the UL, single carrier transmission having an excellent peak-to-average power ratio (PAPR) or cubic metric (CM) characteristic which influences the performance of a power amplifier is maintained for efficient utilization of the power amplifier of the terminal. That is, in the case of transmitting the PUSCH of the existing LTE system, data to be transmitted may maintain the single carrier characteristic through DFT-precoding and in the case of transmitting the PUCCH, information is transmitted while being loaded on a sequence having the single carrier characteristic to maintain the single carrier characteristic. However, when the data to be DFT-precoded is non-contiguously allocated to a frequency axis or the PUSCH and the PUCCH are simultaneously transmitted, the single carrier characteristic deteriorates. Therefore, when the PUSCH is transmitted in the same subframe as the transmission of the PUCCH as illustrated in FIG. 11, uplink control information (UCI) to be transmitted to the PUCCH is transmitted (piggyback) together with data through the PUSCH.

Since the PUCCH and the PUSCH may not be simultaneously transmitted as described above, the existing LTE terminal uses a method that multiplexes uplink control information (UCI) (CQI/PMI, HARQ-ACK, RI, and the like) to the PUSCH region in a subframe in which the PUSCH is transmitted.

As one example, when the channel quality indicator (CQI) and/or precoding matrix indicator (PMI) needs to be transmitted in a subframe allocated to transmit the PUSCH, UL-SCH data and the CQI/PMI are multiplexed after DFT-spreading to transmit both control information and data. In this case, the UL-SCH data is rate-matched by considering a CQI/PMI resource. Further, a scheme is used, in which the control information such as the HARQ ACK, the RI, and the like punctures the UL-SCH data to be multiplexed to the PUSCH region.

FIG. 12 illustrates one example of a signal processing process of an uplink share channel of a transport channel in the wireless communication system to which the present invention can be applied.

Herein, the signal processing process of the uplink share channel (hereinafter, referred to as "UL-SCH") may be applied to one or more transport channels or control information types.

Referring to FIG. 12, the UL-SCH transfers data to a coding unit in the form of a transport block (TB) once every a transmission time interval (TTI).

A CRC parity bit $p_0, p_1, p_2, p_3, \ldots, p_{L-1}$ is attached to a bit of the transport block received from the upper layer (S120). In this case, A represents the size of the transport block and L represents the number of parity bits. Input bits to which the CRC is attached are shown in $b_0, b_1, b_2, b_3, \ldots, b_{B-1}$. In this case, B represents the number of bits of the transport block including the CRC.

$b_0, b_1, b_2, b_3, \ldots, b_{B-1}$ is segmented into multiple code blocks (CBs) according to the size of the TB and the CRC is attached to multiple segmented CBs (S121). Bits after the code block segmentation and the crc attachment are shown in $c_{r0}, c_{r1}, c_{r2}, c_{r3}, \ldots, c_{r(K_r-1)}$. herein, r represents No. (r=0, ..., C−1) of the code block and Kr represents the bit number depending on the code block r. Further, C represents the total number of code blocks.

Subsequently, channel coding is performed (S122). Output bits after the channel coding are shown in $d_{r0}^{(i)}, d_{r1}^{(i)}, d_{r2}^{(i)}, d_{r3}^{(i)}, \ldots, d_{r(D_r-1)}^{(i)}$. In this case, i represents an encoded stream index and may have a value of 0, 1, or 2. Dr represents the number of bits of the i-th encoded stream for the code block r. r represents the code block number (r=0, ..., C−1) and C represents the total number of code blocks. Each code block may be encoded by turbo coding.

Subsequently, rate matching is performed (S123). Bits after the rate matching are shown in $e_{r0}, e_{r1}, e_{r2}, e_{r3}, \ldots, e_{r(E_r-1)}$. In this case, r represents the code block number (r=0, ..., C−1) and C represents the total number of code blocks. Er represents the number of rate-matched bits of the r-th code block.

Subsequently, concatenation among the code blocks is performed again (S124). Bits after the concatenation of the code blocks is performed are shown in $f_0, f_1, f_2, f_3, \ldots, f_{G-1}$. In this case, G represents the total number of bits encoded for transmission and when the control information is multiplexed with the UL-SCH, the number of bits used for transmitting the control information is not included.

Meanwhile, when the control information is transmitted in the PUSCH, channel coding of the CQI/PMI, the RI, and the ACK/NACK which are the control information is independently performed (S126, S127, and S128). Since different encoded symbols are allocated for transmitting each control information, the respective control information has different coding rates.

In time division duplex (TDD), as an ACK/NACK feedback mode, two modes of ACK/NACK bundling and ACK/NACK multiplexing are supported by an upper-layer configuration. ACK/NACK information bits for the ACK/NACK bundling are constituted by 1 bit or 2 bits and ACK/NACK information bits for the ACK/NACK multiplexing are constituted by 1 to 4 bits.

After the concatenation among the code blocks in step S134, encoded bits $f_0, f_1, f_2, f_3, \ldots, f_{G-1}$ of the UL-SCH data and encoded bits $q_0, q_1, q_2, q_3, \ldots, q_{N_L \cdot Q_{CQI}-1}$ of the CQI/PMI are multiplexed (S125). A multiplexed result of the data and the CQI/PMI is shown $g_0, g_1, g_2, g_3, \ldots, g_{H'-1}$. In this case, $g_i$ (i=0, . . . , H'−1) represents a column vector having a length of $(Q_m \cdot N_L)$. $H=(G+N_L \cdot Q_{CQI})$ and $H'=H/(N_L \cdot Q_m)$. $N_L$ represents the number of layers mapped to a UL-SCH transport block and H represents the total number of encoded bits allocated to $N_L$ transport layers mapped with the transport block for the UL-SCH data and the CQI/PMI information.

Subsequently, the multiplexed data and CQI/PMI, a channel encoded RI, and the ACK/NACK are channel-interleaved to generate an output signal (S129).

Multi-Input Multi-Output (MIMO)

An MIMO technology uses multiple transmitting (Tx) antennas and multiple receiving (Rx) antennas by breaking from generally one transmitting antenna and one receiving antenna up to now. In other words, the MIMO technology is a technology for achieving capacity increment or capability enhancement by using a multiple input multiple output antenna at a transmitter side or a receiver side of the wireless communication system. Hereinafter, "MIMO" will be referred to as "multiple input multiple output antenna".

In more detail, the MIMO technology does not depend on one antenna path in order to receive one total message and completes total data by collecting a plurality of data pieces received through multiple antennas. Consequently, the MIMO technology may increase a data transfer rate within in a specific system range and further, increase the system range through a specific data transfer rate.

In next-generation mobile communication, since a still higher data transfer rate than the existing mobile communication is required, it is anticipated that an efficient multiple input multiple output technology is particularly required. In such a situation, an MIMO communication technology is a next-generation mobile communication technology which may be widely used in a mobile communication terminal and a relay and attracts a concern as a technology to overcome a limit of a transmission amount of another mobile communication according to a limit situation due to data communication extension, and the like.

Meanwhile, the multiple input multiple output (MIMO) technology among various transmission efficiency improvement technologies which have been researched in recent years as a method that may epochally improve a communication capacity and transmission and reception performance without additional frequency allocation or power increment has the largest attention in recent years.

FIG. 13 is a configuration diagram of a general multiple input multiple output (MIMO) communication system.

Referring to FIG. 13, when the number of transmitting antennas increases to NT and the number of receiving antennas increases to NR at the same time, since a theoretical channel transmission capacity increases in proportion to the number of antennas unlike a case using multiple antennas only in a transmitter or a receiver, a transfer rate may be improved and frequency efficiency may be epchally improved. In this case, the transfer rate depending on an increase in channel transmission capacity may theoretically increase to a value acquired by multiplying a maximum transfer rate (Ro) in the case using one antenna by a rate increase rate (Ri) given below.

$$R_i = \min(N_T, N_R) \qquad \text{[Equation 1]}$$

That is, for example, in an MIMO communication system using four transmitting antennas and four receiving antennas, a transfer rate which is four times higher than a single antenna system may be acquired.

Such an MIMO antenna technology may be divided into a spatial diversity scheme increasing transmission reliability by using symbols passing through various channel paths and a spatial multiplexing scheme improving the transfer rate by simultaneously transmitting multiple data symbols by using multiple transmitting antennas. Further, a research into a scheme that intends to appropriately acquire respective advantages by appropriately combining two schemes is also a field which has been researched in recent years.

The respective schemes will be described below in more detail.

First, the spatial diversity scheme includes a space-time block coding series and a space-time Trelis coding series scheme simultaneously using a diversity gain and a coding gain. In general, the Trelis is excellent in bit error rate enhancement performance and code generation degree of freedom, but the space-time block code is simple in operational complexity. In the case of such a spatial diversity gain, an amount corresponding to a multiple (NT×NR) of the number (NT) of transmitting antennas and the number (NR) of receiving antennas may be acquired.

Second, the spatial multiplexing technique is a method that transmits different data arrays in the respective transmitting antennas and in this case, mutual interference occurs among data simultaneously transmitted from the transmitter in the receiver. The receiver receives the data after removing the interference by using an appropriate signal processing technique. A noise removing scheme used herein includes a maximum likelihood detection (MLD) receiver, a zero-forcing (ZF) receiver, a minimum mean square error (MMSE) receiver, a diagonal-bell laboratories layered space-time (D-BLAST), a vertical-bell laboratories layered space-time), and the like and in particular, when channel information may be known in the transmitter side, a singular value decomposition (SVD) scheme, and the like may be used.

Third, a technique combining the space diversity and the spatial multiplexing may be provided. When only the spatial diversity gain is acquired, the performance enhancement gain depending on an increase in diversity degree is gradually saturated and when only the spatial multiplexing gain is acquired, the transmission reliability deteriorates in the radio channel. Schemes that acquire both two gains while solving the problem have been researched and the schemes include a space-time block code (Double-STTD), a space-time BICM (STBICM), and the like.

In order to describe a communication method in the MIMO antenna system described above by a more detailed method, when the communication method is mathematically modeled, the mathematical modeling may be shown as below.

First, it is assumed that NT transmitting antennas and NR receiving antennas are present as illustrated in FIG. 13.

First, in respect to a transmission signal, when NT transmitting antennas are provided, since the maximum number of transmittable information is NT, NT may be expressed as a vector given below.

$$s=[s_1,s_2,\ldots,s_{N_T}]^T \quad \text{[Equation 2]}$$

Meanwhile, transmission power may be different in the respective transmission information s1, s2, ..., sNT and in this case, when the respective transmission power is P1, P2, ..., PNT, the transmission information of which the transmission power is adjusted may be expressed as a vector given below.

$$\hat{s}=[\hat{s}_1,\hat{s}_2,\ldots,\hat{s}_{N_T}]^T=[P_1s_1,P_2s_2,\ldots,P_{N_T}s_{N_T}]^T \quad \text{[Equation 3]}$$

Further, ŝ may be expressed as described below as a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vectors of which the transmission power is adjusted is multiplied by a weight matrix W to constitute NT transmission signals x1, x2, ..., xNT which are actually transmitted. Herein, the weight matrix serves to appropriately distribute the transmission information to the respective antennas according to a transmission channel situation, and the like. The transmission signals x1, x2, ..., xNT may be expressed as below by using a vector x.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Herein, wij represents a weight between the i-th transmitting antenna and j-th transmission information and W represents the weight as the matrix. The matrix W is called a weight matrix or a precoding matrix.

Meanwhile, the transmission signal x described above may be divided into transmission signals in a case using the spatial diversity and a case using the spatial multiplexing.

In the case using the spatial multiplexing, since different signals are multiplexed and sent, all elements of an information vector s have different values, while when the spatial diversity is used, since the same signal is sent through multiple channel paths, all of the elements of the information vector s have the same value.

Of course, a method mixing the spatial multiplexing and the spatial diversity may also be considered. That is, for example, a case may also be considered, which transmits the same signal by using the spatial diversity through three transmitting antennas and different signals are sent by the spatial multiplexing through residual transmitting antennas.

Next, when NR receiving antennas are provided, received signals y1, y2, ..., yNR of the respective antennas are expressed as a vector y as described below.

$$y=[y_1,y_2,\ldots,y_{N_R}]^T \quad \text{[Equation 6]}$$

Meanwhile, in the case of modeling the channel in the MIMO antenna communication system, respective channels may be distinguished according to transmitting and receiving antenna indexes and a channel passing through a receiving antenna i from a transmitting antenna j will be represented as hij. Herein, it is noted that in the case of the order of the index of hij, the receiving antenna index is earlier and the transmitting antenna index is later.

The multiple channels are gathered into one to be expressed even as vector and matrix forms. An example of expression of the vector will be described below.

FIG. 14 is a diagram illustrating a channel from multiple transmitting antennas to one receiving antenna.

As illustrated in FIG. 14, a channel which reaches receiving antenna I from a total of NT transmitting antennas may be expressed as below.

$$h_i^T=[h_{i1},h_{i2},\ldots,h_{iN_T}] \quad \text{[Equation 7]}$$

Further, all of channels passing through NR receiving antennas from NT transmitting antennas may be shown as below through matrix expression shown in Equation given above.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

Meanwhile, since additive white Gaussian noise (AWGN) is added after passing through a channel matrix H given above in an actual channel, white noises n1, n2, ..., nNR added to NR receiving antennas, respectively are expressed as below.

$$n=[n_1,n_2,\ldots,n_{N_R}]^T \quad \text{[Equation 9]}$$

Each of the transmission signal, the reception signal, the channel, and the white noise in the MIMO antenna communication system may be expressed through a relationship given below by modeling the transmission signal, the reception signal, the channel, and the white noise.

$$y = \begin{bmatrix} y_1 \\ y_2 \\ \vdots \\ y_i \\ \vdots \\ y_{N_R} \end{bmatrix}$$

$$= \begin{bmatrix} h_{11} & h_{11} & \cdots & h_{1N_T} \\ h_{21} & h_{21} & \cdots & h_{2N_T} \\ \vdots & \vdots & \ddots & \vdots \\ h_{i1} & h_{i2} & \cdots & h_{iN_T} \\ \vdots & \vdots & \ddots & \vdots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx+n$$

[Equation 10]

The numbers of rows and columns of the channel matrix H representing the state of the channel are determined by the numbers of transmitting and receiving antennas. In the case of the channel matrix H, the number of rows becomes equivalent to NR which is the number of receiving antennas and the number of columns becomes equivalent to NR which is the number of transmitting antennas. That is, the channel matrix H becomes an NR×NR matrix.

In general, a rank of the matrix is defined as the minimum number among the numbers of independent rows or columns. Therefore, the rank of the matrix may not be larger than the number of rows or columns. As an equation type example, the rank (rank(H)) of the channel matrix H is limited as below.

$$\text{rank}(H) \leq \min(N_T, N_R) \quad \text{[Equation 11]}$$

Further, when the matrix is subjected to Eigen value decomposition, the rank may be defined as not 0 but the number of Eigen values among the Eigen values. By a similar method, when the rank is subjected to singular value decomposition, the rank may be defined as not 0 but the number of singular values. Accordingly, a physical meaning of the rank in the channel matrix may be the maximum number which may send different information in a given channel.

In the present specification, a 'rank' for MIMO transmission represents the number of paths to independently transmit the signal at a specific time and in a specific frequency resource and 'the number of layers' represents the number of signal streams transmitted through each path. In general, since the transmitter side transmits layers of the number corresponding to the number of ranks used for transmitting the signal, the rank has the same meaning as the number layers if not particularly mentioned.

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

When the data is transmitted and received by using the MIMO antenna, a channel state between the transmitting antenna and the receiving antenna need to be detected in order to accurately receive the signal. Therefore, the respective transmitting antennas need to have individual reference signals.

The downlink reference signal includes a common RS (CRS) shared by all terminals in one cell and a dedicated RS (DRS) for a specific terminal. Information for demodulation and channel measurement may be provided by using the reference signals.

The receiver side (that is, terminal) measures the channel state from the CRS and feeds back the indicators associated with the channel quality, such as the channel quality indicator (CQI), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The DRS may be transmitted through resource elements when data demodulation on the PDSCH is required. The terminal may receive whether the DRS is present through the upper layer and is valid only when the corresponding PDSCH is mapped. The DRS may be referred to as the UE-specific RS or the demodulation RS (DMRS).

FIG. 15 illustrates a reference signal pattern mapped to a downlink resource block pair in the wireless communication system to which the present invention can be applied.

Referring to FIG. 15, as a wise in which the reference signal is mapped, the downlink resource block pair may be expressed by one subframe in the timedomain×12 subcarriers in the frequency domain. That is, one resource block pair has a length of 14 OFDM symbols in the case of a normal cyclic prefix (CP) (FIG. 15a) and a length of 12 OFDM symbols in the case of an extended cyclic prefix (CP) (FIG. 15b). Resource elements (REs) represented as '0', '1', '2', and '3' in a resource block lattice mean the positions of the CRSs of antenna port indexes '0', '1', '2', and '3', respectively and resource elements represented as 'D' means the position of the DRS.

Hereinafter, when the CRS is described in more detail, the CRS is used to estimate a channel of a physical antenna and distributed in a whole frequency band as the reference signal which may be commonly received by all terminals positioned in the cell. Further, the CRS may be used to demodulate the channel quality information (CSI) and data.

The CRS is defined as various formats according to an antenna array at the transmitter side (base station). The 3GPP LTE system (for example, release-8) supports various antenna arrays and a downlink signal transmitting side has three types of antenna arrays of three single transmitting antennas, two transmitting antennas, and four transmitting antennas. When the base station uses the single transmitting antenna, a reference signal for a single antenna port is arrayed. When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule of mapping the CRS to the resource block is defined as below.

$$k = 6m + (v + v_{shift}) \bmod 6 \quad \text{[Equation 12]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 12, k and l represent the subcarrier index and the symbol index, respectively and p represents the antenna port. $N_{symb}^{DL}$ represents the number of OFDM symbols in one downlink slot and $N_{RB}^{DL}$ represents the number of radio resources allocated to the downlink. ns represents a slot index and, $N_{ID}^{cell}$ represents a cell ID. mod represents an modulo operation. The position of the reference signal varies depending on the $v_{shift}$ value in the frequency domain. Since $v_{shift}$ is subordinated to the cell ID, the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 13 shows the case of the normal CP and Equation 14 shows the case of the extended CP.

$$k = (k') \bmod N_{sc}^{RB} + N_{sc}^{RB} \cdot n_{PRB} \quad \text{[Equation 13]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 14]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 12 to 14 given above, k and p represent the subcarrier index and the antenna port, respectively. $N_{RB}^{DL}$, ns, and $N_{ID}^{cell}$ represent the number of RBs, the number of slot indexes, and the number of cell IDs allocated to the downlink, respectively. The position of the RS varies depending on the $v_{shift}$ value in terms of the frequency domain.

In Equations 13 and 14, k and l represent the subcarrier index and the symbol index, respectively and p represents the antenna port. $N_{sc}^{RB}$ represents the size of the resource block in the frequency domain and is expressed as the number of subcarriers. $n_{PRB}$ represents the number of physical resource blocks. $N_{RB}^{PDSCH}$ represents a frequency band of the resource block for the PDSCH transmission. ns represents the slot index and $N_{ID}^{cell}$ represents the cell ID. mod represents the modulo operation. The position of the reference signal varies depending on the $v_{shift}$ value in the frequency domain. Since $v_{shift}$ is subordinated to the cell ID, the position of the reference signal has various frequency shift values according to the cell.

Sounding Reference Signal (SRS)

The SRS is primarily used for the channel quality measurement in order to perform frequency-selective scheduling and is not associated with transmission of the uplink data and/or control information. However, the SRS is not limited thereto and the SRS may be used for various other purposes for supporting improvement of power control and various start-up functions of terminals which have not been scheduled. One example of the start-up function may include an initial modulation and coding scheme (MCS), initial power control for data transmission, timing advance, and frequency semi-selective scheduling. In this case, the frequency semi-selective scheduling means scheduling that selectively allocates the frequency resource to the first slot of the subframe and allocates the frequency resource by pseudo-randomly hopping to another frequency in the second slot.

Further, the SRS may be used for measuring the downlink channel quality on the assumption that the radio channels between the uplink and the downlink are reciprocal. The assumption is valid particularly in the time division duplex in which the uplink and the downlink share the same frequency spectrum and are divided in the time domain.

Subframes of the SRS transmitted by any terminal in the cell may be expressed by a cell-specific broadcasting signal. A 4-bit cell-specific 'srsSubframeConfiguration' parameter represents 15 available subframe arrays in which the SRS may be transmitted through each radio frame. By the arrays, flexibility for adjustment of the SRS overhead is provided according to a deployment scenario.

A 16-th array among them completely turns off a switch of the SRS in the cell and is suitable primarily for a serving cell that serves high-speed terminals.

FIG. 16 illustrates an uplink subframe including a sounding reference signal symbol in the wireless communication system to which the present invention can be applied.

Referring to FIG. 16, the SRS is continuously transmitted through a last SC FDMA symbol on the arrayed subframes. Therefore, the SRS and the DMRS are positioned at different SC-FDMA symbols.

The PUSCH data transmission is not permitted in a specific SC-FDMA symbol for the SRS transmission and consequently, when sounding overhead is highest, that is, even when the SRS symbol is included in all subframes, the sounding overhead does not exceed approximately 7%.

Each SRS symbol is generated by a base sequence (random sequence or a sequence set based on Zadoff-Ch (ZC)) associated with a given time wise and a given frequency band and all terminals in the same cell use the same base sequence. In this case, SRS transmissions from a plurality of terminals in the same cell in the same frequency band and at the same time are orthogonal to each other by different cyclic shifts of the base sequence to be distinguished from each other.

SRS sequences from different cells may be distinguished fro each other by allocating different base sequences to respective cells, but orthogonality among different base sequences is not assured.

Coordinated Multi-Point Transmission and Reception (COMP)

According to a demand of LTE-advanced, CoMP transmission is proposed in order to improve the performance of the system. The CoMP is also called co-MIMO, collaborative MIMO, network MIMO, and the like. It is anticipated that the CoMP will improves the performance of the terminal positioned at a cell edge and improve an average throughput of the cell (sector).

In general, inter-cell interference decreases the performance and the average cell (sector) efficiency of the terminal positioned at the cell edge in a multi-cell environment in which a frequency reuse index is 1. In order to alleviate the inter-cell interference, the LTE system adopts a simple passive method such as fractional frequency reuse (FFR) in the LTE system so that the terminal positioned at the cell edge has appropriate performance efficiency in an interference-limited environment. However, a method that reuses the inter-cell interference or alleviates the inter-cell interference as a signal (desired signal) which the terminal needs to receive is more preferable instead of reduction of the use of the frequency resource for each cell. The CoMP transmission scheme may be adopted in order to achieve the aforementioned object.

The CoMP scheme which may be applied to the downlink may be classified into a joint processing (JP) scheme and a coordinated scheduling/beamforming (CS/CB) scheme.

In the JP scheme, the data may be used at each point (base station) in a CoMP wise. The CoMP wise means a set of base stations used in the CoMP scheme. The JP scheme may be again classified into a joint transmission scheme and a dynamic cell selection scheme.

The joint transmission scheme means a scheme in which the signal is simultaneously transmitted through a plurality of points which are all or fractional points in the CoMP wise. That is, data transmitted to a single terminal may be simultaneously transmitted from a plurality of transmission points. Through the joint transmission scheme, the quality of the signal transmitted to the terminal may be improved regardless of coherently or non-coherently and interference with another terminal may be actively removed.

The dynamic cell selection scheme means a scheme in which the signal is transmitted from the single point through the PDSCH in the CoMP wise. That is, data transmitted to the single terminal at a specific time is transmitted from the single point and data is not transmitted to the terminal at another point in the CoMP wise. The point that transmits the data to the terminal may be dynamically selected.

According to the CS/CB scheme, the CoMP wise performs beamforming through coordination for transmitting the data to the single terminal. That is, the data is transmitted to the terminal only in the serving cell, but user scheduling/beamforming may be determined through coordination of a plurality of cells in the CoMP wise.

In the case of the uplink, CoMP reception means receiving the signal transmitted by the coordination among a plurality of points which are geographically separated. The CoMP scheme which may be applied to the uplink may be classified into a joint reception (JR) scheme and the coordinated scheduling/beamforming (CS/CB) scheme.

The JR scheme means a scheme in which the plurality of points which are all or fractional points receives the signal transmitted through the PDSCH in the CoMP wise. In the CS/CB scheme, only the single point receives the signal transmitted through the PDSCH, but the user scheduling/beamforming may be determined through the coordination of the plurality of cells in the CoMP wise.

Relay Node (RN)

The relay node transfers data transmitted and received between the base station and the terminal through two different links (a backhaul link and an access link). The base station may include a donor cell. The relay node is wirelessly connected to a wireless access network through the donor cell.

Meanwhile, in respect to the use of a band (spectrum) of the relay node, a case in which the backhaul link operates in the same frequency band as the access link is referred to as 'in-band' and a case in which the backhaul link and the access link operate in different frequency bands is referred to as 'out-band'. In both the cases of the in-band and the out-band, a terminal (hereinafter, referred to as a legacy terminal) that operates according to the existing LTE system (for example, release-8) needs to be able to access the donor cell.

The relay node may be classified into a transparent relay node or a non-transparent relay node according to whether the terminal recognizing the relay node. Transparent means a case in which it may not be recognized whether the terminal communicates with the network through the relay node and non-transparent means a case in which it is recognized whether the terminal communicates with the network through the relay node.

In respect to control of the relay node, the relay node may be divided into a relay node which is constituted as a part of the donor cell or a relay node that autonomously controls the cell.

The relay node which is constituted as a part of the donor cell may have a relay node identity (ID), but does not have a cell identity thereof.

When at least a part of radio resource management (RRM) is controlled by a base station to which the donor cell belongs, even though residual parts of the RRM are positioned at the relay node, the relay node is referred to as the relay node which is constituted as a part of the donor cell. Preferably, the relay node may support the legacy terminal. For example, various types including smart repeaters, decode-and-forward relay nodes, L2 (second layer) relay nodes, and the like and a type-2 relay node correspond to the relay node.

In the case of the relay node that autonomously controls the cell, the relay node controls one or a plurality of cells and unique physical layer cell identities are provided to the respective cells controlled by the relay node. Further, the respective cells controlled by the relay node may use the same RRM mechanism. In terms of the terminal, there is no difference between accessing the cell controlled by the relay node and accessing a cell controlled by a general base station. The cell controlled by the relay node may support the legacy terminal. For example, a self-backhauling relay node, an L3 (third layer) relay node, a type-1 relay node, and a type-1 a relay node correspond to the relay node.

The type-1 relay node as the in-band relay node controls a plurality of cells and the plurality of respective cells are recognized as separate cells distinguished from the donor cell in terms of the terminal. Further, the plurality of respective cells may have physical cell IDs (they are defined in the LTE release-8) and the relay node may transmit a synchronization channel, the reference signal, and the like thereof. In the case of a single-cell operation, the terminal may receive scheduling information and an HARQ feedback directly from the relay node and transmit control channels (scheduling request (SR), CQI, ACK/NACK, and the like) thereof to the relay node. Further, the type-1 relay node is shown as a legacy base station (a base station that operates according to the LTE release-8 system) to the legacy terminals (terminal that operate according to the LTE release-8 system). That is, the type-1 relay node has the backward compatibility. Meanwhile, the terminals that operate according to the LTE-A system recognize the type-1 relay node as a base station different from the legacy base station to provide performance improvement.

The type-1a relay node has the same features as the type-1 relay node including operating as the out-band The operation of the type-1a relay node may be configured so that an influence on an L1 (first layer) operation is minimized or is not present.

The type-2 relay node as the in-band relay node does not have a separate physical cell ID, and as a result, a new cell is not formed. The type-2 relay node is transparent with respect to the legacy terminal and the legacy terminal may not recognize the presence of the type-2 relay node. The type-2 relay node may transmit the PDSCH, but at least does not transmit the CRS and the PDCCH.

Meanwhile, in order for the relay node to operate as the in-band, some resources in the time-frequency space needs to be reserved for the backhaul link and the resources may be configured not to be used for the access link. This is referred to as resource partitioning.

A general principle in the resource partitioning in the relay node may be described as below. Backhaul downlink and access downlink may be multiplexed in the time division multiplexing scheme on one carrier frequency (that is, only one of the backhaul downlink and the access downlink is activated at a specific time). Similarly, backhaul uplink and access uplink may be multiplexed in the time division multiplexing scheme on one carrier frequency (that is, only one of the backhaul uplink and the access uplink is activated at a specific time).

In the backhaul link multiplexing in the FDD, backhaul downlink transmission may be performed in a downlink frequency band and backhaul uplink transmission may be performed in an uplink frequency band. In the backhaul link multiplexing in the TDD, THE backhaul downlink transmission may be performed in the downlink subframe of the base station and the relay node and the backhaul uplink transmission may be performed in the uplink subframe of the base station and the relay node.

In the case of the in-band relay node, for example, when both backhaul downlink reception from the base station and access downlink transmission to the terminal are performed in the same frequency band, signal interference may occurs at a receiver side of the relay node by a signal transmitted from a transmitter side of the relay node. That is, the signal interference or RF jamming may occur at an RF front-end of the relay node. Similarly, even when both the backhaul uplink transmission to the base station and the access uplink reception from the terminal are performed in the same frequency band, the signal interference may occur.

Therefore, in order for the relay node to simultaneously transmit and receive the signal in the same frequency band, when sufficient separation (for example, the transmitting antenna and the receiving antenna are installed to be significantly geographically spaced apart from each other like installation on the ground and underground) between a received signal and a transmitted signal is not provided, it is difficult to implement the transmission and reception of the signal.

As one scheme for solving a problem of the signal interference, the relay node operates not transmit the signal to the terminal while receiving the signal from the donor cell. That is, a gap is generated in transmission from the relay node to the terminal and the terminal may be configured not to expect any transmission from the relay node during the gap. The gap may be configured to constitute a multicast broadcast single frequency network (MBSFN) subframe.

FIG. 17 illustrates a structure of relay resource partitioning in the wireless communication system to which the present invention can be applied.

In FIG. 17, in the case of a first subframe as a general subframe, a downlink (that is, access downlink) control signal and downlink data are transmitted from the relay node and in the case of a second subframe as the MBSFN subframe, the control signal is transmitted from the relay node from the terminal in the control region of the downlink subframe, but no transmission is performed from the relay node to the terminal in residual regions. Herein, since the legacy terminal expects transmission of the PDCCH in all downlink subframes (in other words, since the relay node needs to support legacy terminals in a region thereof to perform a measurement function by receiving the PDCCH every subframe), the PDCCH needs to be transmitted in all downlink subframes for a correct operation of the legacy terminal. Therefore, eve on a subframe (second subframe) configured for downlink (that is, backhaul downlink) transmission from the base station to the relay node, the relay does not receive the backhaul downlink but needs to perform the access downlink transmission in first N (N=1, 2, or 3) OFDM symbol intervals of the subframe. In this regard, since the PDCCH is transmitted from the relay node to the terminal in the control region of the second subframe, the backward compatibility to the legacy terminal, which is served by the relay node may be provided. In residual regions of the second subframe, the relay node may receive transmission from the base station while no transmission is performed from the relay node to the terminal. Therefore, through the resource partitioning scheme, the access downlink transmission and the backhaul downlink reception may not be simultaneously performed in the in-band relay node.

The second subframe using the MBSFN subframe will be described in detail. The control region of the second subframe may be referred to as a relay non-hearing interval. The relay non-hearing interval means an interval in which the relay node does not receive the backhaul downlink signal and transmits the access downlink signal. The interval may be configured by the OFDM length of 1, 2, or 3 as described above. In the relay node non-hearing interval, the relay node may perform the access downlink transmission to the terminal and in the residual regions, the relay node may receive the backhaul downlink from the base station. In this case, since the relay node may not simultaneously perform transmission and reception in the same frequency band, It takes a time for the relay node to switch from a transmission mode to a reception mode. Therefore, in a first partial interval of a backhaul downlink receiving region, a guard time (GT) needs to be set so that the relay node switches to the transmission/reception mode. Similarly, even when the relay node operates to receive the backhaul downlink from the base station and transmit the access downlink to the terminal, the guard time for the reception/transmission mode switching of the relay node may be set. The length of the guard time may be given as a value of the time domain and for example, given as a value of k (k≥1) time samples (Ts) or set to the length of one or more OFDM symbols. Alternatively, when the relay node backhaul downlink subframes are consecutively configured or according to a pre-determines subframe timing alignment relationship, a guard time of a last part of the subrrame may not be defined or set. The guard time may be defined only in the frequency domain configured for the backhaul downlink subframe transmission in order to maintain the backward compatibility (when the guard time is set in the access downlink interval, the legacy terminal may not be supported). In the backhaul downlink reception interval other than the guard time, the relay node may receive the PDCCH and the PDSCH from the base station. This may be expressed as a relay (R)-PDCCH and a relay-PDSCH (R-PDSCH) in a meaning of a relay node dedicated physical channel.

Channel State Information (CSI) Feed-Back

The MIMO scheme may be divided into an open-loop scheme and a closed-loop scheme. The open-loop MIMO scheme means that the transmitter side performs MIMO transmission without a feed-back of the channel state information from the MIMO receiver side. The closed-loop MIMO scheme means that the transmitter side performs the MIMO transmission by receiving the feed-back of the channel state information from the MIMO receiver side. In the closed-loop MIMO scheme, each of the transmitter side and the receiver side may perform the beamforming based on the channel state information in order to acquire a multiplexing gain of the MIMO transmitting antenna. The transmitter side (for example, the base station) may allocate an uplink control channel or an uplink share channel to the receiver side (for example, the terminal).

The channel state information (CSI) which is fed back may include the rank indicator (RI), the precoding matrix index (PMI), and the channel quality indicator (CQI).

The RI is information on the rank of the channel. The rank of the channel means the maximum number of layers (alternatively, streams) which may send different information through the same time-frequency resource. Since a rank value is primary determined by long-time fading of the channel, the RI may be generally fed back according to a longer period (that is, less frequently) than the PMI and the CQI.

The PMI is information on the precoding matrix used for transmission from the transmitter side and a value acquired by reflecting spatial characteristics of the channel. Precoding means mapping the transmission layer to the transmitting antenna and a layer-antenna mapping relationship may be determined by a precoding matrix. The PMI corresponds to a precoding matrix index of the base station, which the terminal prefers to based on a measurement value (metric) such as a signal-to-interference plus noise ratio (SINR), or the like. In order to reduce feed-back overhead of precoding information, a scheme may be used, in which the transmitter side and the receiver side previously share a codebook including various precoding matrices and feed back only an index indicating a specific precoding matrix.

The CQI is information indicating the channel quality or a channel intensity. The CQI may be expressed as a predetermined MCS combination. That is, the CQI which is fed back indicates a corresponding modulation scheme and a corresponding code rate. In general, the CQI becomes a value acquired by reflecting a received SINR which may be acquired when the base station configures a spatial channel by using the PMI.

In the system (for example, LTE-A system) supporting the extended antenna configuration, acquiring additional multi-user diversity by using a multi-user-MIMO (MU-MIMO) scheme is considered. In the MU-MIMO scheme, since an interference channel between terminals multiplexed in an antenna domain is present, when the base station performs downlink transmission by using the channel state information which one terminal among the multi users feeds back, the interference in another terminal needs to be prevented. Therefore, channel state information having higher accuracy needs to be fed back than a single-user-MIMO (SU-MIMO) scheme in order to correctly perform the MU-MIMO operation.

A new CSI feed-back scheme that enhances the CSI constituted by the RI, the PMI, and the CQI may be adopted in order to measure and report the more accurate channel state information. For example, the precoding information which the receiver side feeds back may be indicated by combining two PMIs. One (first PMI) among two PMIs may have an attribute of a long term and/or a wideband and be designated as W1. The other one (second PMI) among two PMIs may have an attribute of a short term and/or a subband and be designated as W2. A final PMI may be determined by a combination (alternatively, function) of W1 and W2. For example, when the final PMI is referred to as W, W may be defined as W=W1*W2 or W=W2*W 1.

Herein, W1 reflects average frequency and/or temporal characteristics of the channel. In other words, W may be defined as the channel state information reflecting a characteristic of a long term channel on the time, reflecting a characteristic of a wideband channel on the frequency, or reflecting the characteristics of the long term channel on the time and the wideband channel on the frequency. In order to express the characteristics of W1 in brief, W1 is referred to as the channel state information (alternatively, long term-wideband PMI) of the long term and wideband attributes.

Meanwhile, W2 reflects a relatively more instantaneous channel characteristic than W1. In other words, W2 may be defined as the channel state information reflecting a characteristic of a short-term channel on the time, reflecting a characteristic of a subband channel on the frequency, or reflecting the characteristics of the short term channel on the time and the subband channel on the frequency. In order to express the characteristics of W2 in brief, W2 is referred to as the channel state information (alternatively, short term-subband PMI) of the short term and subband attributes.

In order to determine one final precoding matrix W from the information (for example, W1 and W2) of two different attributes indicating the channel state, separate codebooks (that is, a first codebook for W1 and a second codebook for W2) constituted by the precoding matrixes indicating the channel information of the respective attributes need to be configured. A type of the codebook configured as above may be referred to as a hierarchical codebook. Further, determining a codebook to be finally used by using the hierarchical codebook may be referred to as hierarchical codebook transformation.

In the case of using the code book, higher-accuracy channel feed-back is possible than in the case of using a single codebook. Single-cell MU-MIMO and/or multi-cell coordinated communication may be supported by using the high-accuracy channel feed-back.

Enhanced PMI for MU-MIMO or CoMP

In a next-generation communication standard such as LTE-A, in order to achieve high transmission rate, transmission schemes such as MU-MIMO and CoMP were proposed. In order to implement the improved transmission schemes, the UE needs to feedback complicated and various CSIs to the base station.

For example, in the MU-MIMO, when UE-A selects the PMI, a CSI feedback scheme which uploads desired PMI of the UE-A and the PMI (hereinafter, referred to as best companion PMI (BCPMI)) of the UE scheduled with the UE-A.

That is, in the precoding matrix codebook, when co-scheduled UE is used as a precoder, the BCPMI which gives less interference to the UE-A is calculated and additionally fed-back to the base station.

The base station MU-MIMO-schedules another UE preferring UE-A and best companion precoding matrix (BCPM) (precoding matrix corresponding to the BCPMI) precoding by using the information.

The BCPMI feedback scheme is divided into two of an explicit feedback and an implicit feedback according to presence and absence of the feedback payload.

First, there is the explicit feedback scheme with the feedback payload.

In the explicit feedback scheme, the UE-A determines the BCPMI in the precoding matrix codebook and then feedbacks the determined BCPMI to the base station through a control channel. As one scheme, the UE-A selects an interference signal precoding matrix in which estimated SINR is maximized in the codebook and feedbacks the selected interference signal precoding matrix as the BCPMI value.

As an advantage of the explicit feedback, the BCPMI with more effective interference removal may be selected and transmitted. The UE determines the most effective value in the interference removal as the BCPMI by assuming all the codewords in the codebook one by one as the interference beam and comparing the metric such as SINR. However, as the codebook size is increased, the candidates of the BCPMI are increased, and thus the larger feedback payload size is required.

Second, there is the explicit feedback scheme without the feedback payload.

The implicit feedback scheme is a scheme that the UE-A does not search a codeword which receives less interference in the codebook to select the searched codeword as the BCPMI, but statically determines the BCPMI corresponding to the desired PMI when the desired PMI is determined. In this case, it may be preferred that the BCPM is constituted by orthogonal vectors in the determined desired PMI.

The reason is that the desired PM is set in a direction to maximize the channel gain of the channel H in order to maximize the received SINR and thus, it is effective in mitigating the interference the interference signal is selected by avoiding in the direction of the PM. When the channel H is analyzed as the plurality of independent channels through the singular value decomposition (SVD), the BCPMI determination scheme is further justified. 4×4 channel H may be decomposed through the SVD like the following Equation 15.

$$H = ULV^H \qquad \text{[Equation 15]}$$

$$= [u_1 \; u_2 \; u_3 \; u_4] \begin{bmatrix} \lambda_1 & 0 & 0 & 0 \\ 0 & \lambda_2 & 0 & 0 \\ 0 & 0 & \lambda_3 & 0 \\ 0 & 0 & 0 & \lambda_4 \end{bmatrix} \begin{bmatrix} v_1^H \\ v_2^H \\ v_3^H \\ v_4^H \end{bmatrix}$$

In Equation 15, U, V are unitary matrices, ui, vi, and $\lambda_i$ represent a 4×1 left singular vector, a 4×1 right singular vector, and a singular value of the channel H, respectively and arranged in descending order of $\lambda_i > \lambda_{i+1}$. In the case of using the beamforming matrix V in the transmission terminal and the beamforming matrix $U^H$ in the reception terminal, all channel gains which may be theoretically obtained may be obtained without loss.

In the case of Rank 1, using the transmission beamforming vector v1 and the reception beamforming vector u1 may obtain the channel $|\lambda_i|^2$ to gain obtain optimal performance in terms of the SNR. For example, it is advantageous that the UE-A selects the most similar PM to v1 in the case of rank 1. Ideally, when the desired PM completely coincides with v1, the reception beam is set to u1 and the transmission beam of the interference signal is set to the PM in the orthohonal direction to completely remove the interference signal without loss in the desired signal. Actually, due to the quantization error, when the desired PM has a slight difference from v1, the transmission beam of the interference signal set in the orthogonal direction to the PM is no longer equal to the orthogonal beam to v1, and thus, the desired signal may not completely remove the interference signal without loss of the desired signal, but when the quantization error is small to help in controlling the interference signal.

As an example of the implicit feedback, in the case of using the LTE codebook, the BCPMI may be statically determined as the vector index orthogonal to the PMI.

It is assumed that the transmission antennas are four and the reception rank of the UE feedbacking the PMI is 1, three vectors orthogonal to the desired PMI are expressed as three BCPMIs.

For example, in the case of PMI=3, BCPMI=0,1,2. The PMI and the BCPMI represent the index of the 4×1 vector codeword in the codebook. The base station uses some or all as the precoder of the co-schedule UE by considering the BCPMI set(BCPMI=0, 1, 2) as the effective precoding index in the interference removal.

The implicit PMI has an advantage in that there is no additional feedback overhead because the desired PMI and the BCPMI set are mapped to 1:1. However, due to the quantization error of the desired PM (PM: precoding matrix corresponding to the PMI), the BCPM subordinated thereto may have optimal beam direction and error for the interference removal. When there is no quantization error, three BCPMs represent interference beam (ideal interference beam) which completely removes all the interference, but when there is the error, each BCPM occurs a difference from the ideal interference beam.

Further, the difference from the ideal interference beam of each BCPM is averagely the same, but may be different at a certain moment. For example, when desired PMI=3, it may be effective in removing the interference signal in order of BCPMI 0, 1, and 2, and the base station which does not know a relative error of BCPMI 0, 1, and 2 may communicate while the strong interference between the co-scheduled UEs is present by determining BCPMI 2 with the largest error with the ideal interference beam as the beam of the interference signal.

General D2D Communication

Generally, D2D communication is limitatively used as the term for communication between objects or object intelligent communication, but the D2D communication in the present invention may include all communication between various types of devices having a communication function such as a smart phone and a personal computer in addition to simple devices with a communication function.

FIG. 18 is a diagram for schematically describing the D2D communication in a wireless communication system to which the present invention may be applied.

FIG. 18A illustrates a communication scheme based on an existing base station eNB, and the UE1 may transmit the data to the base station on the uplink and the base station may transmit the data to the UE2 on the downlink. The communication scheme may be referred to as an indirect communication scheme through the base station. In the indirect communication scheme, a Un link (referred to as a backhaul link as a link between base stations or a link between the base station and the repeater) and/or a Uu link (referred to as an access link as a link between the base station and the UE or a link between the repeater and the UE) which are defined in the existing wireless communication system may be related.

FIG. 18B illustrates a UE-to-UE communication scheme as an example of the D2D communication, and the data exchange between the UEs may be performed without passing through the base station. The communication scheme may be referred to as a direct communication scheme between devices. The D2D direct communication scheme has advantages of reducing latency and using smaller wireless resources as compared with the existing indirect communication scheme through the base station.

FIG. 19 illustrates examples of various scenarios of the D2D communication to which the method proposed in the specification may be applied.

The D2D communication scenario may be divided into (1) an out-of-coverage network, (2) a partial-coverage network, and (3) in-coverage network according to whether the UE1 and the UE2 are positioned in coverage/out-of-coverage.

The in-coverage network may be divided into an in-coverage-single-cell and an in-coverage-multi-cell according to the number of cells corresponding to the coverage of the base station.

FIG. 19a illustrates an example of an out-of-coverage network scenario of the D2D communication.

The out-of-coverage network scenario means perform the D2D communication between the D2D UEs without control of the base station.

In FIG. 19a, only the UE1 and the UE2 are present and the UE1 and the UE2 may directly communicate with each other.

FIG. 19b illustrates an example of a partial-coverage network scenario of the D2D communication.

The partial-coverage network scenario means performing the D2D communication between the D2D UE positioned in the network coverage and the D2D UE positioned out of the network coverage.

In FIG. 19b, it may be illustrated that the D2D UE positioned in the network coverage and the D2D UE positioned out of the network coverage communicate with each other.

FIG. 19c illustrates an example of the in-coverage-single-cell and FIG. 19d illustrates an example of the in-coverage-multi-cell scenario.

The in-coverage network scenario means that the D2D UEs perform the D2D communication through the control of the base station in the network coverage.

In FIG. 19c, the UE1 and the UE2 are positioned in the same network coverage (alternatively, cell) under the control of the base station.

In FIG. 19d, the UE1 and the UE2 are positioned in the network coverage, but positioned in different network coverages. In addition, the UE1 and the UE2 performs the D2D communication under the control of the base station managing the network coverage.

Here, the D2D communication will be described in more detail.

The D2D communication may operate in the scenario illustrated in FIG. 19, but generally operate in the network coverage and out of the network coverage. The link used for the D2D communication (direct communication between the UEs) may be referred to as D2D link, directlink, or sidelink, but for the convenience of description, the link is commonly referred to as the sidelink.

The sidelink transmission may operate in uplink spectrum in the case of the FDD and in the uplink (alternatively, downlink) subframe in the case of the TDD. For multiplexing the sidelink transmission and the uplink transmission, time division multiplexing (TDM) may be used.

The sidelink transmission and the uplink transmission do not simultaneously occur. In the uplink subframe used for the uplink transmission and the sidelink subframe which partially or entirely overlaps with UpPTS, the sidelink transmission does not occur. Alternatively, the transmission and the reception of the sidelink do not simultaneously occur.

A structure of a physical resource used in the sidelink transmission may be used equally to the structure of the uplink physical resource. However, the last symbol of the sidelink subframe is constituted by a guard period and not used in the sidelink transmission.

The sidelink subframe may be constituted by extended CP or normal CP.

The D2D communication may be largely divided into discovery, direct communication, and synchronization.

1) Discovery

The D2D discovery may be applied in the network coverage. (including inter-cell and intra-cell). Displacement of synchronous or asynchronous cells may be considered in the inter-cell coverage. The D2D discovery may be used for various commercial purposes such as advertisement, coupon issue, and finding friends to the UE in the near area.

When the UE 1 has a role of the discovery message transmission, the UE 1 transmits the discovery message and the UE 2 receives the discovery message. The transmission and the reception of the UE 1 and the UE 2 may be reversed. The transmission from the UE 1 may be received by one or more UEs such as UE2.

The discovery message may include a single MAC PDU, and here, the single MAC PDU may include a UE ID and an application ID.

A physical sidelink discovery channel (PSDCH) may be defined as the channel transmitting the discovery message. The structure of the PSDCH channel may reuse the PUSCH structure.

A method of allocating resources for the D2D discovery may use two types Type 1 and Type 2.

In Type 1, eNB may allocate resources for transmitting the discovery message by a non-UE specific method.

In detail, a wireless resource pool for discovery transmission and reception constituted by the plurality of subframes is allocated at a predetermined period, and the discovery transmission UE transmits the next discovery message which randomly selects the specific resource in the wireless resource pool.

The periodical discovery resource pool may be allocated for the discovery signal transmission by a semi-static method. Setting information of the discovery resource pool for the discovery transmission includes a discovery period, the number of subframes which may be used for transmission of the discovery signal in the discovery period (that is, the number of subframes constituted by the wireless resource pool).

In the case of the in-coverage UE, the discovery resource pool for the discovery transmission is set by the eNB and may notified to the UE by using RRC signaling (for example, a system information block (SIB)).

The discovery resource pool allocated for the discovery in one discovery period may be multiplexed to TDM and/or FDM as a time-frequency resource block with the same size, and the time-frequency resource block with the same size may be referred to as a 'discovery resource'.

The discovery resource may be used for transmitting the discovery MAC PDU by one UE. The transmission of the MAC PDU transmitted by one UE may be repeated (for example, repeated four times) contiguously or non-contiguously in the discovery period (that is, the wireless resource pool). The UE randomly selects the first discovery resource in the discovery resource set) which may be used for the repeated transmission of the MAC PDU and other discovery resources may be determined in relation with the first discovery resource. For example, a predetermined pattern is preset and according to a position of the first selected discovery resource, the next discovery resource may be determined according to a predetermined pattern. Further, the UE may randomly select each discovery resource in the discovery resource set which may be used for the repeated transmission of the MAC PDU.

In Type 2, the resource for the discovery message transmission is UE-specifically allocated. Type 2 is sub-divided into Type-2A and Type-2B again. Type-2A is a type in which the UE allocates the resource every transmission instance of the discovery message in the discovery period, and the type 2B is a type in which the resource is allocated by a semi-persistent method.

In the case of Type 2B, RRC_CONNECTED UE request allocation of the resource for transmission of the D2D discovery message to the eNB through the RRC signaling. In addition, the eNB may allocate the resource through the RRC signaling. When the UE is transited to a RRC_IDLE state or the eNB withdraws the resource allocation through the RRC signaling, the UE releases the transmission resource allocated last. As such, in the case of the type 2B, the wireless resource is allocated by the RRC signaling and activation/deactivation of the wireless resource allocated by the PDCCH may be determined.

The wireless resource pool for the discovery message reception is set by the eNB and may notified to the UE by using RRC signaling (for example, a system information block (SIB)).

The discovery message reception UE monitors all of the discovery resource pools of Type 1 and Type 2 for the discovery message reception.

2) Direct Communication

An application area of the D2D direct communication includes in-coverage and out-of-coverage, and edge-of-coverage. The D2D direct communication may be used on the purpose of public safety (PS) and the like.

When the UE 1 has a role of the direct communication data transmission, the UE 1 transmits direct communication data and the UE 2 receives direct communication data. The transmission and the reception of the UE 1 and the UE 2 may be reversed. The direct communication transmission from the UE 1 may be received by one or more UEs such as UE2.

The D2D discovery and the D2D communication are not associated with each other and independently defined. That is, the in groupcast and broadcast direct communication, the D2D discovery is not required. As such, when the D2D discovery and the D2D communication are independently defined, the UEs need to recognize the adjacent UEs. In other words, in the case of the groupcast and broadcast direct communication, it is not required that all of the reception UEs in the group are close to each other.

A physical sidelink shared channel (PSSCH) may be defined as a channel transmitting D2D direct communication data. Further, a physical sidelink control channel (PSCCH) may be defined as a channel transmitting control information (for example, scheduling assignment (SA) for the direct communication data transmission, a transmission format, and the like) for the D2D direct communication. The PSSCH and the PSCCH may reuse the PUSCH structure.

A method of allocating the resource for D2D direct communication may use two modes mode 1 and mode 2.

Mode 1 means a mode of scheduling a resource used for transmitting data or control information for D2D direct communication. Mode 1 is applied to in-coverage.

The eNB sets a resource pool required for D2D direct communication. Here, the resource pool required for D2D direct communication may be divided into a control information pool and a D2D data pool. When the eNB schedules the control information and the D2D data transmission resource in the pool set to the transmission D2D UE by using the PDCCH or the ePDCCH, the transmission D2D UE transmits the control information and the D2D data by using the allocated resource.

The transmission UE requests the transmission resource to the eNB, and the eNB schedules the control information and the resource for transmission of the D2D direct communication data. That is, in the case of mode 1, the transmission UE needs to be in an RRC_CONNECTED state in order to perform the D2D direct communication. The transmission UE transmits the scheduling request to the eNB and a buffer status report (BSR) procedure is performed so that the eNB may determine an amount of resource required by the transmission UE.

The reception UEs monitor the control information pool and may selectively decode the D2D data transmission related with the corresponding control information when decoding the control information related with the reception UEs. The reception UE may not decode the D2D data pool according to the control information decoding result.

Mode 2 means a mode in which the UE arbitrarily selects the specific resource in the resource pool for transmitting the data or the control information for D2D direct communication. In the out-of-coverage and/or the edge-of-coverage, the mode 2 is applied.

In mode 2, the resource pool for transmission of the control information and/or the resource pool for transmission of the D2D direct communication data may be pre-configured or semi-statically set. The UE receives the set resource pool (time and frequency) and selects the resource for the D2D direct communication transmission from the resource pool. That is, the UE may select the resource for the control information transmission from the control information resource pool for transmitting the control information. Further, the UE may select the resource from the data resource pool for the D2D direct communication data transmission.

In D2D broadcast communication, the control information is transmitted by the broadcasting UE. The control information explicitly and/or implicitly indicate the position of the resource for the data reception in associated with the physical channel (that is, the PSSCH) transporting the D2D direct communication data.

3) Synchronization

A D2D synchronization signal (alternatively, a sidelink synchronization signal) may be used so that the UE obtains time-frequency synchronization. Particularly, in the case of the out-of-coverage, since the control of the eNB is impossible, new signal and procedure for synchronization establishment between UEs may be defined.

The UE which periodically transmits the D2D synchronization signal may be referred to as a D2D synchronization source. When the D2D synchronization source is the eNB, the structure of the transmitted D2D synchronization signal may be the same as that of the PSS/SSS. When the D2D synchronization source is not the eNB (for example, the UE or the global navigation satellite system (GNSS)), a structure of the transmitted D2D synchronization signal may be newly defined.

The D2D synchronization signal is periodically transmitted for a period of not less than 40 ms. Each UE may have multiple physical-layer sidelink synchronization identities. The D2D synchronization signal includes a primary D2D synchronization signal (alternatively, a primary sidelink synchronization signal) and a secondary D2D synchronization signal (alternatively, a secondary sidelink synchronization signal).

Before transmitting the D2D synchronization signal, first, the UE may search the D2D synchronization source. In addition, when the D2D synchronization source is searched, the UE may obtain time-frequency synchronization through the D2D synchronization signal received from the searched D2D synchronization source. In addition, the corresponding UE may transmit the D2D synchronization signal.

Hereinafter, for clarity, direct communication between two devices in the D2D communication is exemplified, but the scope of the present invention is not limited thereto, and the same principle described in the present invention may be applied even to the D2D communication between two or more devices.

As one of the D2D discovery schemes, there is a scheme in which all the UEs perform the discovery by a distribution method (hereinafter, referred to as 'distributed discovery'). A scheme of performing the distributive D2D discovery means a scheme in which all the UEs distributively decides themselves to select the discovery resource and transmits and receives the discovery message.

Hereinafter, in the specification, for the D2D discovery, signals (alternatively, messages) which are periodically transmitted by the UEs may be referred to as a discovery message, a discovery signal, a beacon, and the like. Hereinafter, for convenience of description, the signals are collectively referred to as the discovery messages.

In the distributive discovery, as a resource for transmitting and receiving the discovery message by the UE, a separate dedicated resource from a cellular resource may be periodically allocated. This will be described with reference to FIG. 21 below.

FIG. 20 illustrates an example of a frame structure in which a discovery resource to which the methods proposed in the specification may be applied is allocated.

Referring to FIG. 20, in the distributive discovery scheme, among all the cellular uplink frequency-time resource, a discovery subframe 2001 (that is, a 'discovery resource pool') for discovery is fixedly (alternatively, dedicatedly) allocated, and the remaining area is constituted by an existing LTE uplink wide area network (WAN) subframe area 2003. The discovery resource pool may be constituted by one or more subframes.

The discovery resource pool may be periodically allocated at a predetermined interval (that is, a 'discovery period'). Further, the discovery resource pool may be repetitively set within one discovery period.

FIG. 20 illustrates an example in which the discovery resource pool is allocated at a discovery period of 10 sec and 64 contiguous subframes are allocated to each discovery resource pool. However, the discovery period and the size of the time/frequency resource of the discovery resource pool are not limited thereto.

The UE selects a resource (that is, a 'discovery resource') for transmitting the discovery message itself in the dedicatedly allocated discovery pool and transmits the discovery message through the selected resource. This will be described with reference to FIG. 21 below.

FIG. 21 is a diagram schematically exemplifying a discovery process to which the method proposed in the specification may be applied.

Referring to FIGS. 20 and 21, the discovery scheme is constituted by three steps: sensing a resource for transmitting the discovery message (S2101), selecting a resource for the message transmission (S2103), and transmitting and receiving the discovery message (S2105).

First, in the sensing of the resource for transmitting the discovery message (S2101), all the UEs performing the D2D discovery completely receive (that is, sense) the discovery message for 1 period (that is, the discovery resource pool) of the D2D discovery resource by a distributive method (that is, by themselves). For example, in FIG. 20, when the uplink bandwidth is 10 MHz, all the UEs fully receive (that is, sense) the discovery message which is transmitted in N=44 RB (since the entire uplink bandwidth is 10 MHz, 6 RBs for PUCCH transmission in a total of 50 RBs are used) for K=64 msec (64 subframes).

In addition, in the selecting of the resource for transmitting the discovery message (S2103), the UE classifies resources with a low energy level among the sensed resources and randomly selects the discovery resource in a predetermined range (for example, lower x % (x=any integer, 5, 7, 10, . . . )) among the resources.

The discovery resource may be constituted by one or more resource blocks with the same size and may be multiplexed to TDM and/or FDM in the discovery resource pool.

In addition, in the transmitting and receiving of the discovery message as the final process (S2105), the UE transmits and receives the discovery message based on the discovery resource selected after one discovery period (after P=10 seconds in the example of FIG. 20) and periodically transmits and receives the discovery message according to a random resource hopping pattern at a subsequent discovery period.

The D2D discovery procedure is proceeded even in the RRC_CONNECTED state where the UE is connected with the eNB and continuously performed even in the RRC_IDLE state where the UE is not connected with the eNB.

Considering the discovery scheme, all the UEs sense all resources (that is, the discovery resource pool) which are transmitted by neighboring UEs and randomly select the discovery resource in a predetermined range (for example, within lower x %).

Hereinafter, the efficient resource allocation method for a D2D UE (DUE) in the D2D communication on a cellular network proposed in the present disclosure will be described.

First, the terms used herein are defined as follows.

CUE: This term is referred to as a cellular UE that performs the cellular communication.

DUE: This term is referred to as a D2D UE that performs the Device-to-Device (D2D) communication.

It is referred that the maximum number of CUEs is M and the maximum number of DUEs is N.

It is referred that the maximum number of Resource Blocks related to the D2D is K.

TUE: This term is referred to as a D2D transmission UE, and may also be referred to as a D2D transmitter.

RUE: This term is referred to as a D2D reception UE, and may also be referred to as a D2D receiver.

According to the resource allocation method proposed in the present disclosure, it is estimated the degree of unintentional interference between a DUE and a CUE, or between DUEs by using the distance information (or position information) of the DUE and the CUE that an eNB knows in advance, considering the fact that it is hard to obtain the Instantaneous channel information between the DUE and the CUE.

In addition, the resource allocation method proposed in the present disclosure relates to a method for allocating resources to a DUE according to the degree of interference that is estimated by an eNB, and in the case that a plurality of resources is allocated to a single DUE, to a method for allocating resources to the DUE within the range of QoS to be guaranteed by estimating the interference anticipated.

The Device-to-Device (D2D) communication that commonly uses a cellular spectrum based on the cellular infrastructure has several merits.

One of them is the proximity of a user equipment (UE) in the D2D communication, which a merit (in comparison with the cellular communication) in an aspect of high bit rate, low latency and low power consumption.

In addition, when using the cellular communication and the D2D communication at the same time, the gain of the frequency reuse is narrowed below the cellular system reuse factor (=1).

Up to now, the resource allocation method for the D2D communication in a cellular network is proposed in the method of allocating resources by statically classifying the resources in order to minimize the interference or the method of applying the resource allocation method that has been used in the conventional cellular communication scheme as it has been proposed.

In the case that the D2D resource is allocated through the central access method (by the control of an eNB), the eNB has high processing burden, and accordingly, latency may occur by the resource scheduling and the overhead transmission.

Hereinafter, in order to solve the problem, the resource allocation method that maximizes the space reuse of frequency by considering the fact that the D2D communication scheme is performed in a narrow radius (or area) will be described in detail.

In addition, according to the method proposed in the present disclosure, the overhead between a D2D UE and an eNB may be maintained in the minimum level although a centralized resource allocation method is used based on the eNB.

Particularly, according to the method proposed in the present disclosure, the D2D resource is allocated by considering the interference caused by the cellular UE in the predictive manner without estimating the interference channel of a cellular UE (or cellular user) by a D2D UE (or D2D user).

Furthermore, by using the method proposed in the present disclosure, a plurality of users (or a plurality of UEs) may share the identical resource as much as possible, thereby the frequency reuse being maximized.

That is, the method proposed in the present disclosure may be summarized as follows.

(1) An eNB calculates and anticipates the interference between a CUE and a DUE (CUE-DUE) and the interference between $CUE_i$ and $DUE_j$ by using the transmission power and position information of the CUE and the DUE only. Herein, i≠j.

(2) Based on the interference anticipated through (1), the eNB allocates a plurality of resources to each of the DUEs until the Quality of Service (QoS) is satisfied based on a specific Signal to Interference plus Noise Ratio (SINR) threshold value.

The channel between a CUE and a DUE and the interference channel between $CUE_i$ and $DUE_j$ may be hard to obtain the instantaneous channel information practically.

Accordingly, in the present disclosure, by using the transmission power of the CUE and the DUE that an eNB instantaneously obtains through the power control in addition to the position information of the CUE and the DUE, the path loss is considered as interference.

And, according to the method proposed in the present disclosure, the most efficient method for the resource allocation is provided by considering the predictive interference of other DUE as a constraint condition when allocating resources to each of the DUEs.

The SC-FDMA resource allocation method in the cellular UL environment is assumed as the system environment to which the method proposed in the present disclosure may be applied, but not limited thereto, and the method proposed in the present disclosure may also be applied to other resource allocation method except the SC-FDMA resource allocation method.

In addition, it is assumed that an eNB knows the position information of a CUE and a DUE and the size of transmission power in advance.

FIG. 22 is a diagram illustrating an example of an interference situation to which the resource allocation method proposed in the present disclosure may be applied.

Generally, the interference situation (shaded area; 2230) that may occur between a CUE and a DUE may be considered as shown in FIG. 22.

That is, the interference may occur between UE1 that corresponds to the CUE and RUE (D2D reception UE), the radiuses 2210 and 2220, which have each of UE1 and RUE as a center, respectively, may be shown based on the position information and the transmission power of UE1 and RUE.

In this case, when the intersection area 2230 between UE1 and RUE occurs, it may be anticipated (or predicted) that interference occurs between UE1 and RUE.

As described above, the influence between the UEs may become greater as the intersection area becomes larger between the radiuses that have different UEs as a center.

In addition, the path loss between a CUE and a DUE and between CUE, and DUE, may be defined by Equation 16 below, and represents the radiuses of circles that have the CUE and the RUE as a center, respectively.

$$P_{C_m D_{n,r}} = c(d_{C_m D_{n,r}})^{-\alpha} P_{C_m} \quad \text{[Equation 16]}$$

$$P_{D_{n,r} D_{n,t}} = c(d_{D_{n,r} D_{n,t}})^{-\alpha} P_{D_{n,r}} \quad \text{[Equation 17]}$$

In Equation 16 and Equation 17 above, $P_{C_m D_{n,r}}$ represents a path-loss value between a CUE and an RUE (reception DUE), $P_{D_{n,r} D_{n,t}}$ represents a path-loss value between an RUE and a TUE (transmission DUE), $P_{C_m}$ represents a transmission power value of a CUE, and $P_{D_{n,r}}$ represents a transmission power value of an RUE.

In addition, c and α are parameter values in relation to the path-loss, and represent a constant value.

Furthermore, the influence of interference with a CUE based on a DUE may be represented by a ratio of the reception power (reception power of RUE) of its own with the reception power caused by the interference (interference caused by a CUE, interference caused by another DUE, and noise).

In this case, the value shown in Equation 18 (the ratio value of reception power) is preferred to be less than a threshold value κ.

$$\frac{P_{D_{n,r} D_{n,t}}(k)}{P_{C_m D_{n,r}}(k) + \sum_{i \neq t, i=1}^{N-1} P_{D_{n,r} D_{n,i}}(k) + N} > \kappa \quad \text{[Equation 18]}$$

Herein, κ represents a specific (predefined or preconfigured) threshold value, and is a value in which outage probability is considered.

In this case, for the channel gain of DUE, a selective fading situation is not considered, but a large scale fading situation is considered only, since only the distance from a CUE (position of DUE) and the transmission power information of the DUE are considered.

Accordingly, all the channel gains for the $i^{th}$ D2D UE that is considered as an interference component, that is, an intended DUE reception end in $DUE_i$, that is, each $k^{th}$ RB to an RUE are identically considered as represented by Equation 19 below.

Similarly, all the interferences with the cellular UE (CUE) that is considered as an interference component are also identically considered represented by Equation 20 below.

$$P_{D_{n,r} D_{n,i}}(1) = P_{D_{n,r} D_{n,i}}(2) = \ldots = P_{D_{n,r} D_{n,i}}(K-1) = P_{D_{n,r} D_{n,i}}(K) \quad \text{[Equation 19]}$$

$$P_{C_m D_{n,r}}(1) = P_{C_m D_{n,r}}(2) = \ldots = P_{C_m D_{n,r}}(K-1) = P_{C_m D_{n,r}}(K) \quad \text{[Equation 20]}$$

As described above, owing to the characteristics as represented by Equation 19 and Equation 20 above, the method for the resource allocation to a DUE proposed in the present disclosure is recommended to perform the resource allocation to a DUE sequentially, different from the maximum SINR method, which is the conventional resource allocation method.

Hereinafter, the method for the resource allocation to a D2D UE proposed in the present disclosure will be described in detail by reference to FIGS. 23 to 28.

FIG. 23 is a flowchart illustrating an example of a resource allocation method proposed in the present disclosure.

First, an eNB preferentially allocates all resources to a CUE in orthogonal manner (step, S2310). One-to-one resource allocation between the eNB and the CUE is considered for the resource allocation in step S2310.

In this case, the unit of resource allocation may be defined as a unit of RB.

That is, the eNB preferentially allocates the resources to all CUEs for all resources κ that satisfy Equation 21 below. Herein, it is considered that each of the RBs is allocated to a single CUE.

$$\text{For } k = 1:K$$
$$m^* = \underset{m}{\operatorname{argmax}} SINR(k) \quad \text{[Equation 21]}$$

Herein, m represents the maximum number of CUEs.

Later, the eNB performs the resource allocation to the DUE from k=1 to K according to the scheduling order (step, S2320), and when allocating every resource to the DUE, the eNB continuously performs the resource allocation to the DUE that satisfies Equation 18 above until satisfying the QoS (step, S2330).

In this case, it is assumed that the scheduling priority is aligned in an ascending order between N (the maximum number of DUEs) DUEs.

Herein, K represents the maximum number of subcarriers, which each DUE is allocated with resource.

Later, each DUE selects resource according to Equation 22 below (step, S2340).

$$k^* = \underset{k \in \mathcal{R}}{\operatorname{argmax}} \left( \frac{P_{D_{n,r} D_{n,t}}(k)}{P_{C_m D_{n,r}}^{(l)}(k) + \sum_{i \neq t, i=1}^{N-1} \alpha P_{D_{n,r} D_{n,i}}^{(l)}(k) + N} \right) \quad \text{[Equation 22]}$$

Herein, α={0,1}, and α is '1' when other DUE uses the resource, and '0' when other DUE does not use the resource.

Later, when the resource that is selected by the DUE according to Equation 22 shares the resource, in the case that the group that currently shares the resource together satisfies Equation 23 below, the eNB allocates the resource that is selected by the DUE to the DUE (step, S2350).

If the resource that is selected by the DUE does not satisfy Equation 23 below, the DUE selects the resource again according to Equation 22 in the resource region except the resource that does not satisfy Equation 23 above (step, S2360).

For j=1:N−1

$$\frac{P_{D_{j,r}D_{j,t}}(k)}{P_{C_mD_{j,r}}(k) + \sum_{i \neq j, i=1}^{N-1} \alpha P_{D_{j,r}D_{j,i}}(k) + N} > \kappa \quad \text{[Equation 23]}$$

Herein, κ represents a threshold value.

That is, the DUE selects a resource according to Equation 22 above, and the eNB allocates resource after determining whether the use of the selected resource is proper according to Equation 23 above.

FIG. 24 is a diagram illustrating an example of allocating resource to a cellular UE according to FIG. 23.

An eNB allocates resource to a CUE according to Equation 22 described above.

That is, as shown in FIG. 24, the eNB allocates RB1 to CUE1, RB2 to CUE3, RB3 to CUE2, RB4 to CUE5, RB5 to CUE4, RB6 to CUE7, RB7 to CUE8 and RB8 to CUE6.

Next, another method of allocating resource to DUEs will be described by reference to FIGS. 25 to 28.

In this case, it is assumed that the method for allocating resource to a CUE is the same as that shown in FIG. 23 and FIG. 24. That is, FIGS. 25 to 28 represent the case in which only the method for allocating resource to a DUE is different from that of FIG. 23 and FIG. 24.

FIGS. 25 to 28 are diagrams illustrating another example of a resource allocation method proposed in the present disclosure.

FIGS. 25 to 28 show a method of sequentially allocating resources to each of DUEs within a resource pool that is available for the DUEs.

That is, FIG. 25 shows the resource state allocated to the DUEs when an eNB allocates the first resource (first RB), and FIG. 26 shows the resource state allocated to the DUEs when an eNB allocates the second resource (second RB). FIG. 27 shows the resource state allocated to the DUEs when an eNB allocates the third resource (third RB), and FIG. 28 shows the resource state allocated to the DUEs when an eNB allocates the fourth resource (fourth RB).

In this case, it is assumed that the resource pool that is available for the DUEs includes RB1 to RB8. The resource pool that is available to the DUEs (RB1 to RB8) is the resource that may be shared among DUEs.

Each of the DUEs may determine whether the RB1 to RB8 satisfy Equation 18 above, and may be allocated with the corresponding RB when Equation 18 is satisfied. That is, each of the DUEs may share resources with other DUEs for the RBs that satisfy Equation 18 above.

Referring to FIG. 25, each of the DUEs determines whether each of the RB indexes (RB1 to RB8) satisfies Equation 18 above sequentially.

That is, when each of the RB indexes satisfies Equation 18 above, each of the DUEs is allocated with the resource that corresponds to the respective RB index.

In FIG. 25, since RB1 does not satisfy Equation 18 above but RB 2 satisfies Equation 18 above, DUE3 may not receive the resource allocation for RB 1 but firstly receives the resource allocation from RB2.

In addition, since RB1, RB2 and RB3 do not satisfy Equation 18 above but RB4 satisfies Equation 18 above, DUE4 firstly receives the resource allocation from RB4. In this way, depending on whether each of the RBs satisfies Equation 18, resource is allocated to each of the DUEs.

FIG. 26 shows the allocation of a plurality of RBs to each of DUEs.

That is, in the GFDMA scheme in which a plurality of UEs is allowed for a single RB, the resource allocation according to FIG. 26 is available.

As shown in FIG. 26, an eNB allocates resources from DU1 according to the scheduling order of the resource allocation.

In FIG. 26, DU1 has been already allocated with resource from RB1, but fails to be allocated with resource from RB2 since RB2 does not satisfy Equation 18 above, and is allocated with resource from RB3 since RB3 satisfy Equation 18 above.

In this way, an eNB allocates the second RB to each of the DUEs.

In FIG. 26, DUE1, DUE2, DUE3, DUE4, DUES, DUE6, DUET and DUE8 are allocated with the resources (RB index, sub RB) of 4, 3, 3, 3, 3, 3, 4 and one, respectively (from the eNB).

In summary, the resource allocation method proposed in the present disclosure, in order to improve the fact that it is practically difficult to share the channel information with an eNB in the D2D communication (or sideline), provides a method of allocating and sharing resources to UEs (CUE and DUE) using the transmission power (or the parameter related to transmission power enabling to infer the transmission power) of UE and the position information (or pseudo position information) of UE that the eNB may easily detect.

That is, the resource allocation method proposed in the present disclosure relates to a resource allocation method in the situation (scenario or environment) that a plurality of RBs shares a single RB instead of one-to-one RB sharing method between an eNB and a UE, which is the conventional resource allocation method in the cellular network, by considering the situation that a DUE communicates in very narrow area and the influence of interference is narrow exerted In addition, according to the resource allocation method proposed in the present disclosure, the diversity effect is expected even in the fast fading environment, and the frequency efficiency may be maximized by allocating a plurality of resources to each of DUEs, different from the conventional resource allocation method in the cellular network.

Furthermore, the resource allocation method proposed in the present disclosure may be applied to the partial sharing situation in addition to the sharing in the full overlapping situation, and may adjust power according to the degree of overlapping.

General Apparatus to which the Present Invention May be Applied

FIG. 29 illustrates an example of inner block diagram of a wireless communication apparatus to which the methods proposed in the present disclosure may be applied.

Referring to FIG. 29, the wireless communication system includes a base station (eNB) 2910 and a plurality of user equipments (UEs) 2920 located within the region of the eNB 2910.

The eNB 2910 includes a processor 2911, a memory 2912 and a radio frequency unit 2913. The processor 2911 implements the functions, processes and/or methods proposed in FIGS. 1 to 28 above. The layers of wireless interface protocol may be implemented by the processor 2911. The memory 2912 is connected to the processor 2911, and stores various types of information for driving the processor 2911. The RF unit 2913 is connected to the processor 2911, and transmits and/or receives radio signals.

The UE 2920 includes a processor 2921, a memory 2922 and a radio frequency unit 2923. The processor 2921 implements the functions, processes and/or methods proposed in FIGS. 1 to 28 above. The layers of wireless interface protocol may be implemented by the processor 2921. The memory 2922 is connected to the processor 2921, and stores various types of information for driving the processor 2921. The RF unit 2923 is connected to the processor 2921, and transmits and/or receives radio signals.

The memories 2912 and 2922 may be located interior or exterior of the processors 2911 and 2921, and may be connected to the processors 2911 and 2921 with well known means. In addition, the eNB 2910 and/or the UE 2920 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

It is available to apply the resource allocation method in a wireless communication system of the present disclosure to the system that supports the D2D communication.

What is claimed is:

1. A method for allocating resource in a wireless communication system that supports a direct communication between user equipments (UEs), the method performed by a base station and comprising:
    obtaining position information and transmission power of at least one first UE and at least one second UE, respectively,
    wherein the at least one first UE is configured to perform a cellular communication between the base station and a user equipment, and the at least one second UE is configured to perform the direct communication; and
    allocating a plurality of resources to the at least one first UE and the at least one second UE based on the position information and the transmission power of the at least one first UE and the at least one second UE,
    wherein, between the at least one first UE and the at least one second UE, the plurality of resources are preferentially allocated to the at least one first UE, and
    wherein the plurality of resources are allocated to the at least one first UE based on a maximum number of the at least one first UE and at least one subcarrier having a maximum Signal-to-Interference plus Noise Ratio (SINR) value among subcarriers allocated to the at least one second UE;
    wherein at least one resource among the plurality or resources is allocated to the at least one second UE based on interference of the at least one first UE, and
    wherein the method further comprises:
    determining whether the at least one resource selected by the at least one second UE is proper according to Equation below:

$$\frac{P_{D_{n,r}D_{n,t}}(k)}{P_{C_m D_{n,r}}(k) + \sum_{i \neq t, i=1}^{N-1} P_{D_{n,r}D_{n,i}}(k) + N} > \kappa, \quad \text{[Equation]}$$

where, $P_{C_m D_{n,r}}$ represents a path-loss value between a CUE and a DUE, $P_{D_{n,r}D_{n,t}}$ represents a path-loss value between a DUE and a TUE, and $P_{D_{n,r}D_{n,t}}$ represents a path-loss value between DUEs.

2. The method of claim 1, wherein the resource is plurality of resources are allocated to the first UE according to Equation below:

$$m^* = \underset{m}{\mathrm{argmax}} SINR(k) \quad \text{[Equation]}$$

where, m* represents a resource preferentially allocated to the at least one first UE, m represents the maximum number of the at least one first UE, k represents a value of 1 to K, K represents the maximum number of the subcarriers allocated to the at least one second UE.

3. The method of claim 1, wherein the resource selected by the second UE is selected according to Equation below:

$$k^* = \underset{k \notin R}{\mathrm{argmax}} \left( \frac{P_{D_{n,r}D_{n,t}}(k)}{P_{C_m D_{n,r}}^{(l)}(k) + \sum_{i \neq t, i=1}^{N-1} \alpha P_{D_{n,r},D_{n,i}}^{(l)}(k) + N} \right),$$ [Equation 5]

where, $P_{C_m D_{n,r}}$ represents a path-loss value between a CUE and an RUE, $P_{D_{n,r}D_{n,t}}$ represents a path-loss value between a DUE and a TUE, $P_{D_{n,r}D_{n,t}}$ represents a path-loss value between DUEs, and α represents a parameter value related to the path-loss.

4. The method of claim 1, when a use of the at least one resource selected by the second UE is not proper, at least one other resource that is to be used by the second UE is selected among the plurality of resources except the at least one resource in according to Equation below:

$$k^* = \underset{k \notin R}{\mathrm{argmax}} \left( \frac{P_{D_{n,r}D_{n,t}}(k)}{P_{C_m D_{n,r}}^{(l)}(k) + \sum_{i \neq t, i=1}^{N-1} \alpha P_{D_{n,r},D_{n,i}}^{(l)}(k) + N} \right),$$ [Equation 20]

where, $P_{C_m D_{n,r}}$ represents a path-loss value between a CUE and an RUE, $P_{D_{n,r}D_{n,t}}$ represents a path-loss value between a DUE and a TUE, $P_{D_{n,r}D_{n,t}}$ represents a path-loss value between DUEs, and α represents a parameter value related to the path-loss.

5. An apparatus for allocating a resource in a wireless communication system that supports a direct communication between UEs, the apparatus for a base station and comprising:
  a radio frequency (RF) unit including a transceiver for transmitting and receiving a radio signal; and
  a processor functionally connected to the RF unit, wherein the processor is configured to;
  obtain position information and transmission power of at least one first UE and at least one second UE, respectively,
    wherein the at least one first UE is configured to perform a cellular communication between the base station and a user equipment, and the at least one second UE is configured to perform the direct communication; and
  allocate a plurality of resources to the at least one first UE and the at least one second UE based on the position information and the transmission power of the at least one first UE and the at least one second UE,
  wherein, between the at least one first UE and the at least one second UE, the plurality of resources are preferentially allocated to the at least one first UE, and
  wherein the plurality of resources are allocated to the at least one first UE based on a maximum number of the at least one first UE and at least one subcarrier having a maximum Signal-to-Interference plus Noise Ratio (SINR) value among subcarriers allocated to the at least one second UE;
  wherein at least one resource among the plurality of resources is allocated to the at least one second UE based on interference of the at least one first UE, and
  wherein the method further comprises:
  determining whether the at least one resource selected by the at least one second UE is proper according to Equation below:

$$\frac{P_{D_{n,r}D_{n,t}}(k)}{P_{C_m D_{n,r}}(k) + \sum_{i \neq t, i=1}^{N-1} P_{D_{n,r},D_{n,i}}(k) + N} > \kappa,$$ [Equation]

where, $P_{C_m D_{n,r}}$ represent a path-loss value between a CUE and a DUE, $P_{D_{n,r}D_{n,t}}$ represents a path-loss value between a DUE and a TUE, and $P_{D_{n,r}D_{n,t}}$ represents a path-loss value between DUEs.

* * * * *